United States Patent
Sagawa

(10) Patent No.: US 10,150,281 B2
(45) Date of Patent: *Dec. 11, 2018

(54) THREE-DIMENSIONAL OBJECT DIVISION OUTPUT APPARATUS AND ITS APPLICATION

(71) Applicant: FUJIFILM Corporation, Tokyo (JP)

(72) Inventor: Masafumi Sagawa, Tokyo (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 14/833,884

(22) Filed: Aug. 24, 2015

(65) Prior Publication Data

US 2016/0077504 A1    Mar. 17, 2016

(30) Foreign Application Priority Data

Sep. 12, 2014 (JP) ................. 2014-186299

(51) Int. Cl.
*G06F 19/00* (2018.01)
*B33Y 50/02* (2015.01)
*B29C 64/386* (2017.01)

(52) U.S. Cl.
CPC ............ *B33Y 50/02* (2014.12); *B29C 64/386* (2017.08)

(58) Field of Classification Search
CPC ...................................................... G06F 17/50
USPC ......................................................... 700/98
See application file for complete search history.

(56) References Cited

U.S. PATENT DOCUMENTS

| | | | | |
|---|---|---|---|---|
| 7,263,236 B2 * | 8/2007 | Park | ....................... | G06T 9/001 345/420 |
| 8,045,769 B2 * | 10/2011 | Wiemker | ................ | G06T 7/11 378/21 |
| 8,605,978 B2 * | 12/2013 | Mizuno | ................. | G06T 7/0012 382/128 |
| 8,842,894 B2 * | 9/2014 | Ihara | ..................... | G06T 7/0012 382/128 |

(Continued)

FOREIGN PATENT DOCUMENTS

| JP | 2003-241647 A | 8/2003 |
|---|---|---|
| JP | 2010-220742 A | 10/2010 |

(Continued)

*Primary Examiner* — Suresh Suryawanshi
(74) *Attorney, Agent, or Firm* — Sughrue Mion, PLLC

(57) ABSTRACT

An extraction unit extracts, from volume data, a three-dimensional object having a tree-structure including plural end-points, plural branch-points, at least one edge each connecting an end-point and a branch-point, and at least one edge each connecting two branch-points. A division position search unit searches for a division candidate position that maximizes, with respect to an output range of a three-dimensional object creation apparatus, the size of at least one of division objects obtainable by dividing the three-dimensional object at the division candidate position on one of the edges of the tree-structure. A division unit divides, at a position on the one of the edges on which the division candidate position is present, the three-dimensional object into division objects the size of at least one of which is within the output range. An output unit outputs the at least one of the division objects to the three-dimensional object creation apparatus.

16 Claims, 17 Drawing Sheets

(56) References Cited

U.S. PATENT DOCUMENTS

| | | | |
|---|---|---|---|
| 8,884,958 B2* | 11/2014 | Tsukagoshi | A61B 5/055 345/419 |
| 2005/0186361 A1* | 8/2005 | Fukuda | G09B 23/30 428/15 |
| 2007/0230775 A1* | 10/2007 | Ariga | H04N 1/603 382/162 |
| 2011/0190626 A1 | 8/2011 | Mizuno | |
| 2012/0275682 A1* | 11/2012 | Ihara | G06T 7/0012 382/134 |
| 2015/0029184 A1 | 1/2015 | Masumoto | |
| 2016/0075088 A1* | 3/2016 | Ihara | B29C 67/0088 700/98 |
| 2016/0148541 A1* | 5/2016 | Ristolainen | G09B 23/285 434/268 |

FOREIGN PATENT DOCUMENTS

| | | |
|---|---|---|
| JP | 2011-212312 A | 10/2011 |
| JP | 2012-200403 A | 10/2012 |
| JP | 2012-228396 A | 11/2012 |
| JP | 2013-222361 A | 10/2013 |

\* cited by examiner

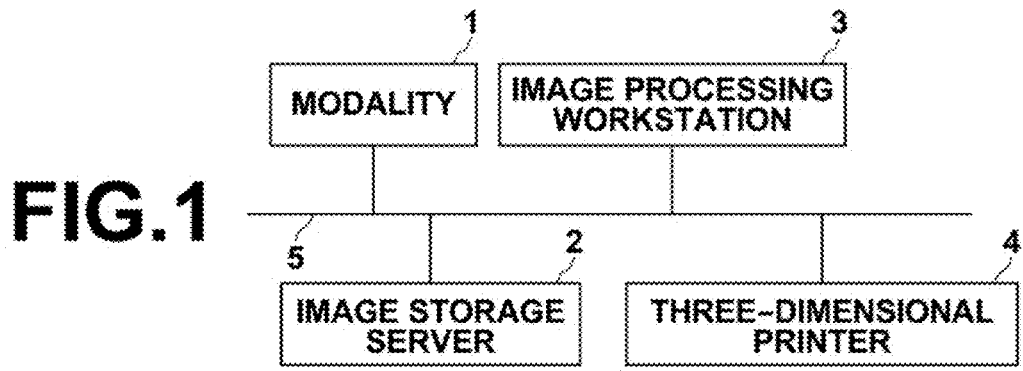
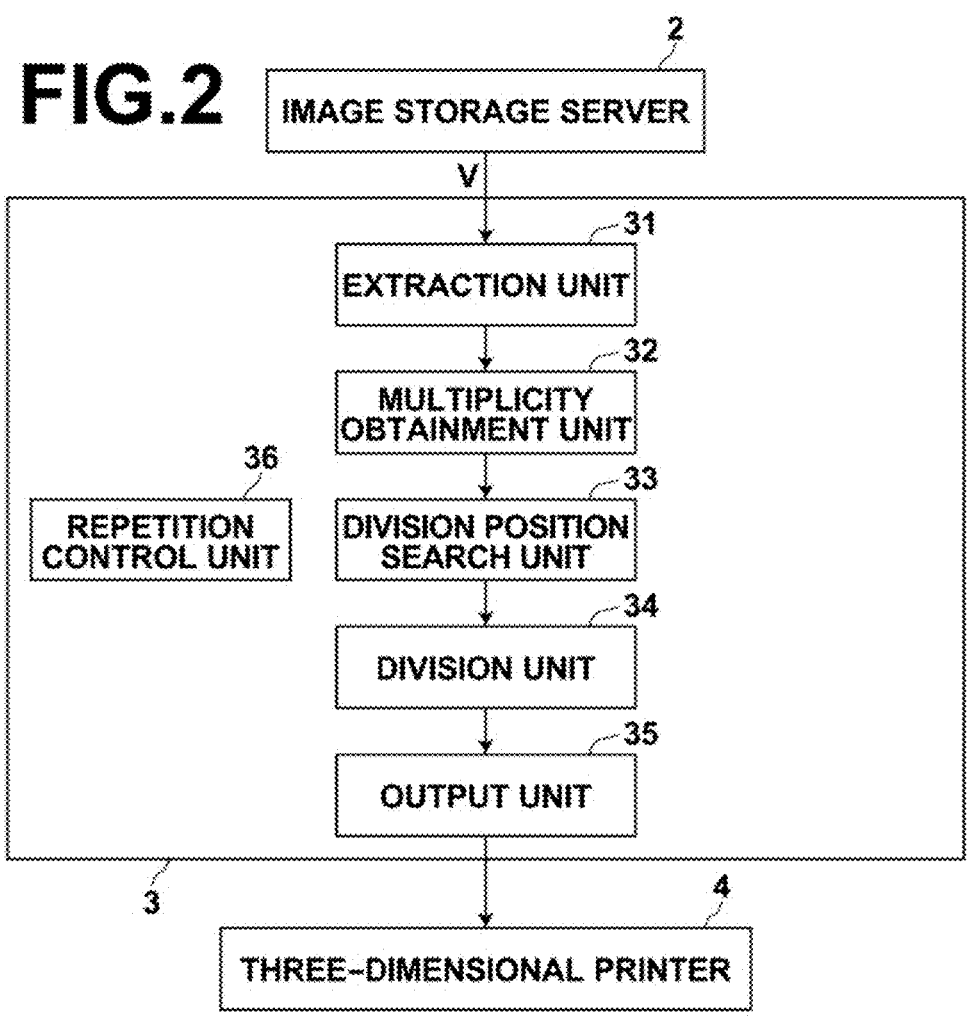

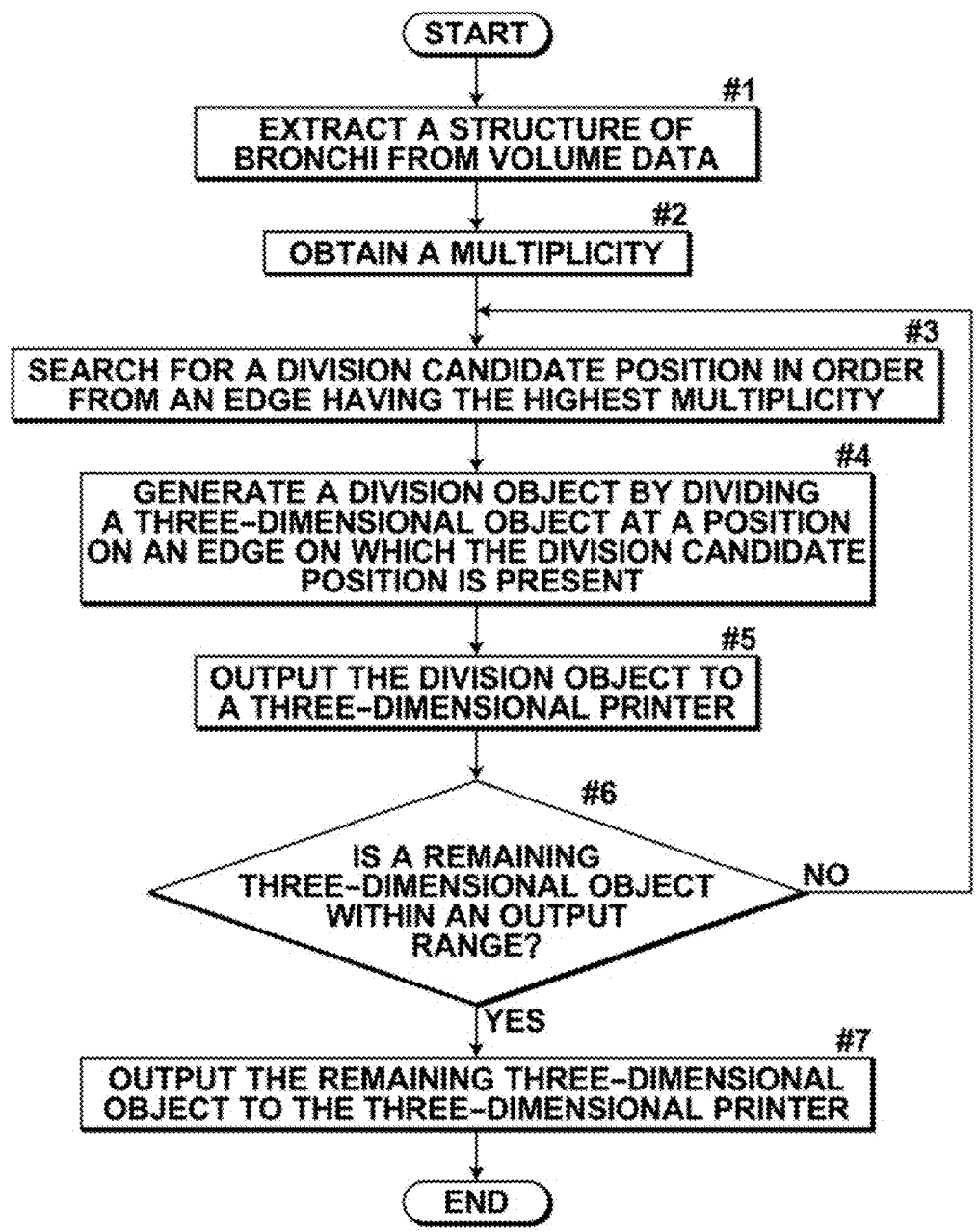

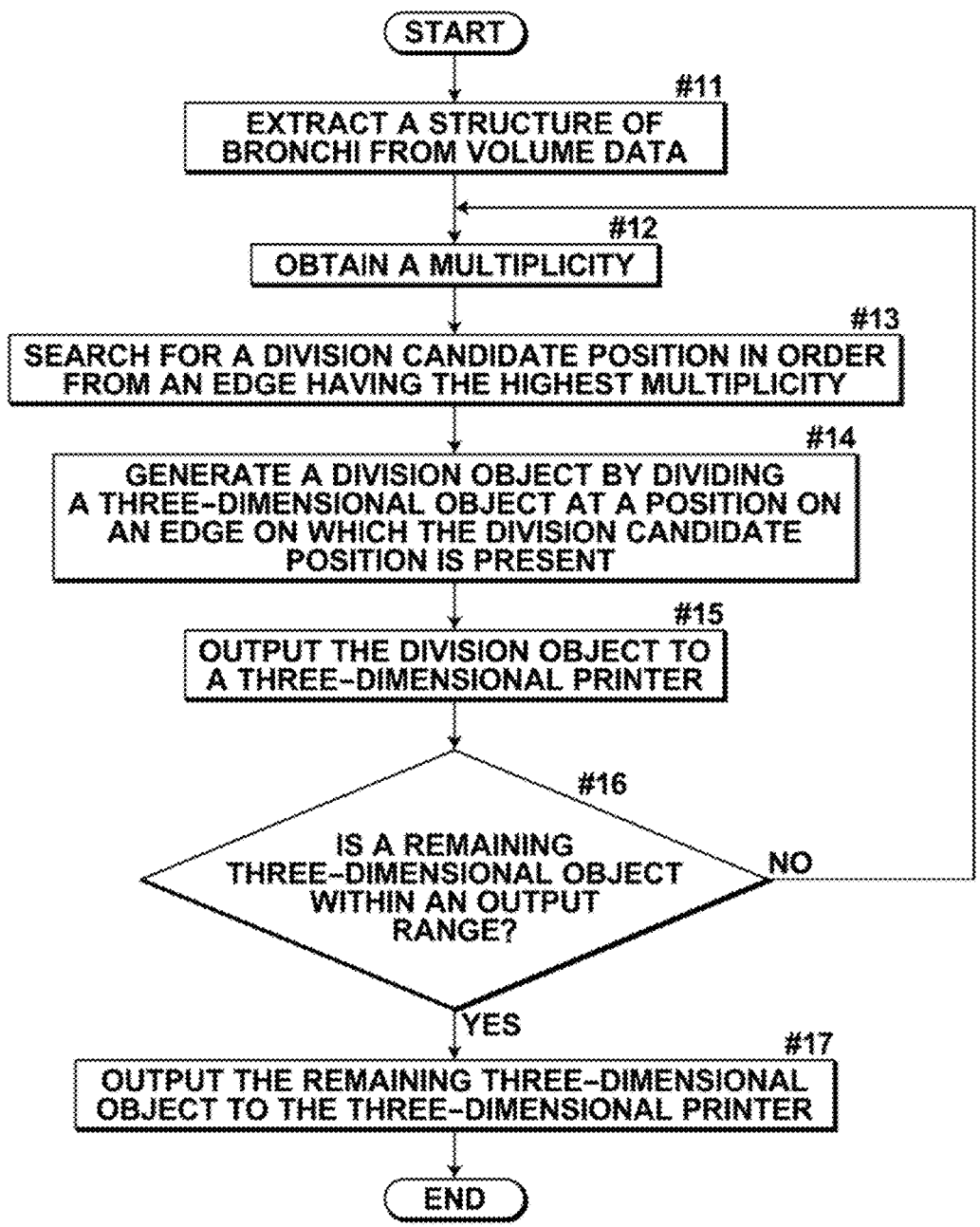

THREE-DIMENSIONAL OBJECT DIVISION OUTPUT APPARATUS AND ITS APPLICATION

CROSS-REFERENCE TO RELATED APPLICATIONS

The present application claims priority under 35 U.S.C. § 119 to Japanese Patent Application No. 2014-186299 filed on Sep. 12, 2014. The above application is hereby expressly incorporated by reference, in its entirety, into the present application.

BACKGROUND

The present disclosure relates to a three-dimensional object division output apparatus that outputs an object having a tree structure by dividing the object into parts that do not exceed an output range of a three-dimensional object creation apparatus when the object is output to the three-dimensional object creation apparatus and its application.

Attempts were made in recent years to produce a three-dimensional model of blood vessels or an organ of a patient for assisting doctors or the like in diagnosis, consideration of a surgery method or the like. Such a three-dimensional model is produced based on tomograms of the patient obtained by a CT (Computed Tomography) apparatus, an MRI (Magnetic Resonance Imaging) apparatus and the like.

For example, Japanese Unexamined Patent Publication No. 2003-241647 (Patent Document 1) discloses a method in which data of a target region are extracted from tomographic data of a patient obtained by imaging the patient by a CT apparatus, an MRI apparatus or the like. Further, cross-sectional data for creating a model are generated from the extracted tomographic data, and a precision powder model is produced by depositing powder material by using the generated cross-sectional data. After then, blood vessels or an organ for each patient is produced with transparent or semi-transparent flexible polymer, such as silicon, by using the produced precision powder model, as a mold.

Further, Japanese Unexamined Patent Publication No. 2013-222361 (Patent Document 2) discloses a method in which structures, such as a liver region, hepatic arteries and hepatic veins, are extracted from three-dimensional volume data, and surface data of these structures are generated. After three-dimensional model data are generated by combining the surface data of the structures, a three-dimensional model is produced by a three-dimensional printer by using slice data obtained by dividing the three-dimensional model at contour surfaces.

SUMMARY

When a large object having a high resolution is output from an object creation apparatus, such as a three-dimensional printer, a large-scale three-dimensional printer corresponding to the size of the object is needed. However, such a large-scale three-dimensional printer is extremely expensive. Therefore, in actual cases, an object is divided into small objects, and each of the small objects is output from a small-scale three-dimensional printer, and the whole large object is produced by joining the small objects together after then.

When an object is divided and output, if the object has a shape, such as a block or a ball, how the object is divided is not a significant issue. However, when the object has a tree structure, such as blood vessels and bronchi, if the object is simply divided into parts corresponding to the shape of a rectangular parallelepiped representing the outputtable range of the three-dimensional printer, end portions of edges of the tree structure are separated into small portions of edges. Therefore, when parts are assembled together later, the number of positions at which the parts are joined together increases. Hence, the method would not be regarded as a realistic division method.

For example, when bronchi, which have a tree structure, are output from a three-dimensional printer, it is desirable to divide the bronchi at a position traversing an interlobar surface to reduce the number of times of joining parts together, and to output a larger object. However, even if the object is divided at the interlobar surface, the size of a divided part exceeds the output range of a three-dimensional printer in some cases.

As described, when an object having a tree structure, such as blood vessels and bronchi, is output from a small-scale three-dimensional printer, it is important to adopt a division method in which an object is divided in such a manner that a small piece is not output from the three-dimensional printer.

In view of the foregoing circumstances, the present disclosure provides a three-dimensional object division output apparatus that outputs a three-dimensional object to a three-dimensional object creation apparatus by dividing the three-dimensional object into parts in such a manner that a small piece is not output when the three-dimensional object is output from the three-dimensional object creation apparatus and its application.

A three-dimensional object division output apparatus of the present disclosure includes an extraction unit that extracts, from volume data, a three-dimensional object having a tree structure including plural end points, plural branch points, at least one edge each connecting one of the plural end points and one of the plural branch points to each other, and at least one edge each connecting two of the plural branch points to each other, a division position search unit that searches for a division candidate position that maximizes, with respect to an output range of a three-dimensional object creation apparatus, the size of at least one of division objects obtainable by dividing the three-dimensional object at the division candidate position on one of the edges of the tree structure of the three-dimensional object, a division unit that divides, at a division position on the one of the edges on which the division candidate position is present, the three-dimensional object into division objects the size of at least one of which is within the output range, and an output unit that outputs the at least one division objects to the three-dimensional object creation apparatus.

An operation method of a three-dimensional object division output apparatus of the present disclosure is an operation method of a three-dimensional object division output apparatus including an extraction unit, a division position search unit, a division unit and an output unit. The method includes an extraction step in which the extraction unit extracts, from volume data, a three-dimensional object having a tree structure including plural end points, plural branch points, at least one edge each connecting one of the plural end points and one of the plural branch points to each other, and at least one edge each connecting two of the plural branch points to each other, a division position search step in which the division position search unit searches for a division candidate position that maximizes, with respect to an output range of a three-dimensional object creation apparatus, the size of at least one of division objects obtainable by dividing the three-dimensional object at the division candidate position on one of the edges of the tree structure of the three-dimensional object, a division step in which the division unit divides, at a position on the one of the edges on which the division candidate position is present, the three-dimensional object into division objects the size of at least one of which is within the output range, and an output step in which the output unit outputs the at least one of the division objects to the three-dimensional object creation apparatus.

A three-dimensional object division output program of the present disclosure causes a computer to execute an extraction step that extracts, from volume data, a three-dimensional object having a tree structure including plural end points, plural branch points, at least one edge each connecting one of the plural end points and one of the plural branch points to each other, and at least one edge each connecting two of the plural branch points to each other, a division position search step that searches for a division candidate position that maximizes, with respect to an output range of a three-dimensional object creation apparatus, the size of at least one of division objects obtainable by dividing the three-dimensional object at the division candidate position on one of the edges of the tree structure of the three-dimensional object, a division step that divides, at a position on the one of the edges on which the division candidate position is present, the three-dimensional object into division objects the size of at least one of which is within the output range, and an output step that outputs the at least one of the division objects to the three-dimensional object creation apparatus.

The "tree structure" includes plural end points, plural branch points, at least one edge each connecting an end point and a branch point to each other, and at least one edge each connecting two branch points to each other, and has a hierarchical structure in which edges branch at branch points. Specifically, the "three-dimensional object having a tree structure" is bronchi, blood vessels and the like.

The "output range of a three-dimensional object creation apparatus" is represented by the maximum height, width and depth of an object that the three-dimensional object creation apparatus can output. Further, the expression "maximizes, with respect to an output range of a three-dimensional object creation apparatus, the size of the division object" means that all of the height, width and depth of the division object are less than or equal to the maximum height, width and depth of the output range of the three-dimensional object creation apparatus, and that at least one of the height, width and depth of the division object is the maximum size of the output range of the three-dimensional object creation apparatus. Further, what is meant by the expression "maximizes, with respect to an output range of a three-dimensional object creation apparatus, the size of the division object" may include a case in which at least one of the height, width and depth of an inclined division object is the maximum size of the output range of the three-dimensional object creation apparatus.

The three-dimensional object division output apparatus may further include a multiplicity obtainment unit that obtains, based on all paths reaching the plural end points from at least one point on the tree structure of the three-dimensional object, a multiplicity for each edge by counting the number of times of passage of each path through each edge. Further, the division position search unit may search for the division candidate position in order of the multiplicity from an edge having a highest multiplicity.

The "at least one point on the tree structure of the three-dimensional object" may be an end point of the three structure, or a branch point of the tree structure, or a point on an edge of the tree structure.

Further, the three-dimensional object division output apparatus may further include a repetition control unit that repeatedly generates, with respect to the tree structure of the three-dimensional object excluding the at least one of the division objects, a new division object by the division position search unit and the division unit.

Alternatively, the three-dimensional object division output apparatus may further include a repetition control unit that repeatedly generates, with respect to the tree structure of the three-dimensional object excluding the at least one of the division objects, a new division object by the multiplicity obtainment unit, the division position search unit and the division unit.

Further, the division position search unit may search for the division candidate position that maximizes, with respect to the output range, a circumscribed rectangular parallelepiped that is circumscribed around a convex hull formed by envelope surfaces obtained by using end points of the tree structure included in the at least one of the division objects.

The expression "maximizes, with respect to the output range, a circumscribed rectangular parallelepiped" means that all of the height, width and depth of the circumscribed rectangular parallelepiped are less than or equal to the maximum height, width and depth of the output range of the three-dimensional object creation apparatus, and that at least one of the height, width and depth of the circumscribed rectangular parallelepiped is the maximum size of the output range of the three-dimensional object creation apparatus.

Further, it is desirable that the circumscribed rectangular parallelepiped is a smallest rectangular parallelepiped, which is circumscribed around the convex hull and has a smallest volume.

Further, it is desirable that the output unit outputs the at least one of the division objects by rotating the at least one of the division objects to a direction in which an edge of the circumscribed rectangular parallelepiped is parallel to an edge of a rectangular parallelepiped of the output range of the three-dimensional creation apparatus and also the circumscribed rectangular parallelepiped is within the rectangular parallelepiped of the output range.

Further, the multiplicity obtainment unit may obtain, based on all paths reaching, from one of the plural end points of the tree-structure of the three-dimensional object, the plural end points other than the one of the plural end points, the multiplicity for each edge by counting the number of times of passage of each path through each edge.

Further, the multiplicity obtainment unit may obtain, based on all paths reaching, from a specific one of the plural end points, the plural end points other than the specific one of the plural end points or all paths reaching, from a specific point on the tree structure of the three-dimensional object other than the plural end points, the plural end points, the multiplicity for each edge by counting the number of times of passage of each path through each edge.

Further, the multiplicity obtainment unit may obtain, with respect to each of two partial tree structures obtained by dividing the tree structure of the three-dimensional object into two at a point on an edge selected from the at least one edge each connecting two branch points of the tree structure of the three-dimensional object to each other, the multiplicity based on all paths reaching, from the point on the selected edge, end points of the respective partial tree structures, and determine, as the multiplicity of the selected edge, the multiplicity having a smaller value of the multiplicities obtained for the two partial tree structures.

Further, the multiplicity obtainment unit may obtain the multiplicity for each edge by adding all of the numbers of times of passage of each path through each edge, and each of the numbers of times having been obtained for each of the plural end points by performing count based on all paths reaching, from one of the plural end points, the plural end points other than the one of the plural end points.

Further, the division unit may divide the three-dimensional object at the division position that makes the size of the at least one of the division objects within the output range, and at which the three-dimensional object is widest (which means in a largest diameter or the like) on the edge on which the division candidate position is present.

The division position search unit may search for the division candidate position on one of the at least one edge each connecting two branch points to each other at which the size of at least one of division objects obtainable by performing division at the one of the at least one edge changes from a size within the output range to a size exceeding the output range.

According to the present disclosure, a division position that maximizes, with respect to an output range of a three-dimensional object creation apparatus, the size of a division object obtainable by dividing a three-dimensional object at a position on an edge of the tree structure of the three-dimensional object is searched for, and a division object obtained by dividing the three-dimensional object is generated and output to a three-dimensional printer. Accordingly, it is possible to divide the three-dimensional object in such a manner that a small piece is not output, and to output the three-dimensional object to the three-dimensional printer by minimizing the number of times of output. Further, it is possible to reduce the number of positions at which parts are joined together when the divided parts of the three-dimensional object are assembled together.

Note that the program of the present disclosure may be provided being recorded on a computer readable medium. Those who are skilled in the art would know that computer readable media are not limited to any specific type of device, and include, but are not limited to: floppy disks, CD's, RAM's, ROM's, hard disks, and magnetic tapes. Such computer-readable storage media store data and/or instructions that cause a machine to perform the functions in the present disclosure.

BRIEF DESCRIPTION OF THE DRAWINGS

FIG. 1 is a schematic diagram illustrating the configuration of a three-dimensional model production system to which a three-dimensional object division output apparatus according to an embodiment of the present disclosure has been applied;

FIG. 2 is a functional block diagram of a three-dimensional object division output unit according to an embodiment of the present disclosure;

FIG. 3 is a flow chart showing a flow of processing of a three-dimensional model production system according to an embodiment of the present disclosure (No. 1);

FIG. 9 is a flow chart showing a flow of processing of a three-dimensional model production system according to an embodiment of the present disclosure (No. 2);

DETAILED DESCRIPTION OF THE PREFERRED EMBODIMENTS

Figure 4:
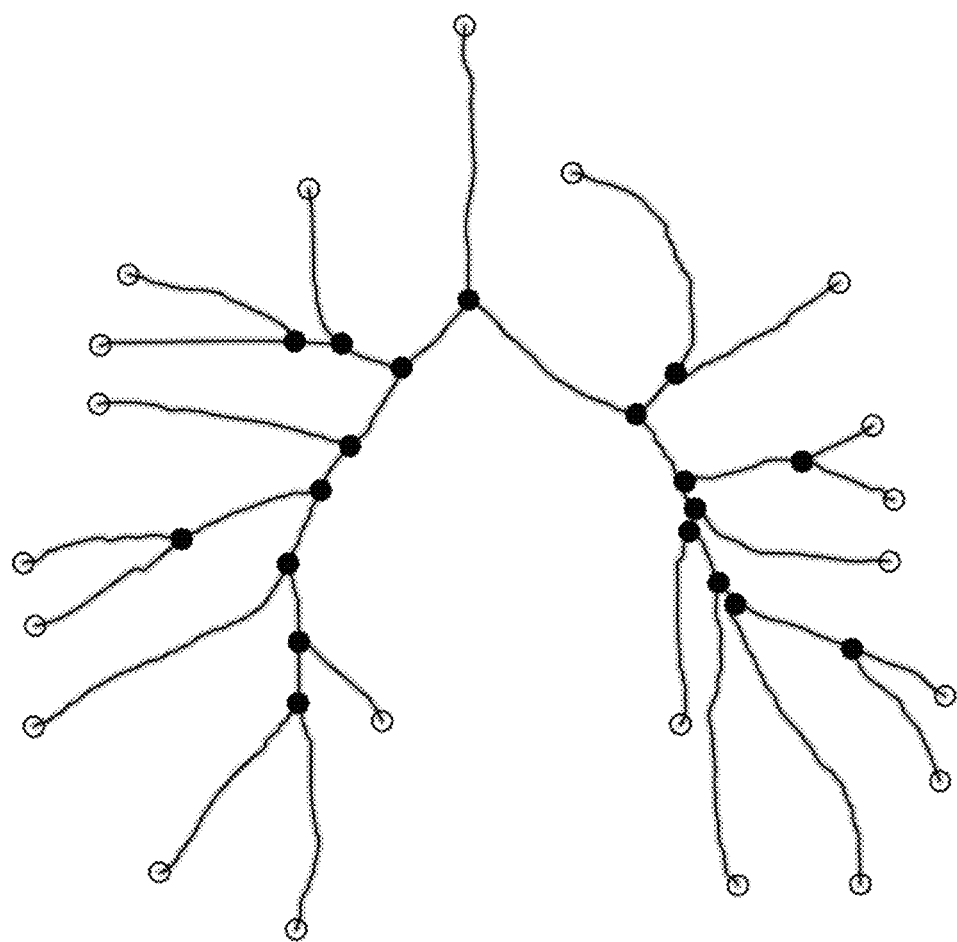
FIG. 4 is a diagram illustrating an example of a tree structure.

Embodiments of a three-dimensional object division output apparatus of the present disclosure will be described with reference to drawings. FIG. 1 is a schematic diagram illustrating the hardware configuration of a three-dimensional model production system in which a three-dimensional object division output apparatus is provided. As illustrated in FIG. 1, this system includes a modality 1, an image storage server 2, an image processing workstation 3, and a three-dimensional object creation apparatus 4, which are connected to each other through a network 5 in such a manner that they can communicate with each other.

The modality 1 may include an apparatus that generates image data of a three-dimensional medical image representing a target region of a patient by imaging the target region, and outputs the image data, as image information, by attaching supplementary information defined by the DICOM (Digital Imaging and Communications in Medicine) standard to the image data. Specific examples are image data obtained by imaging by a CT, MRI or the like. In the following descriptions, image data of a three-dimensional medical image will be used, as volume data.

The image storage server 2 is a computer that stores, in an image database, volume data obtained at the modality 1 or image data generated by image processing at the image processing workstation 3, and manages the data. The image storage server 2 includes a large capacity external storage apparatus and software for managing database (for example, ORDB (Object Relational Database) management software).

The image processing workstation 3 is a computer that performs, based on a request by a user, image processing on volume data obtained from the modality 1 or the image storage server 2. The image processing workstation 3 includes known hardware configuration, such as a CPU (Central Processing Unit), a main memory, an auxiliary storage unit, an input output interface, a communication interface, an input device (a mouse, keyboard and the like), a display device (a display monitor) and a data bus. Further, a known operating system or the like has been installed in the image processing workstation 3. The three-dimensional object division output apparatus of the present disclosure has been installed in this image processing workstation 3. The processing of the three-dimensional object division output apparatus is performed by executing a program installed from a recording medium, such as a CD-ROM (Compact Disc Read Only Memory). Alternatively, the program may be installed after being downloaded from a storage apparatus of a server connected through a network, such as the Internet.

The three-dimensional object creation apparatus 4 generates data of contour surfaces (cross-sectional data or the like) of a three-dimensional object to be output, and produces a three-dimensional object by depositing, based on the cross-sectional data, cross-sectional shapes one on another. As a method for producing a three-dimensional object, there are an inkjet method, in which liquid resin is gradually cured by outputting ultraviolet rays or the like to the resin, an FDM (Fused Deposition Modeling) method, in which thermally fused resin is successively deposited little by little, a binding jetting method, in which an adhesive is jetted onto powder resin, and the like. Hereafter, the three-dimensional object creation apparatus will be referred to as a three-dimensional printer.

FIG. 2 is a block diagram illustrating a three-dimensional object division output unit according to an embodiment of the present disclosure, which is one of functions of the image processing workstation 3. FIG. 3 is a flow chart showing a flow of processing. As illustrated in FIG. 2, the three-dimensional object division output unit in an embodiment of the present disclosure is achieved by an extraction unit 31, a multiplicity obtainment unit 32, a division position search unit 33, a division unit 34, an output unit 35 and a repetition control unit 36.

Next, the three-dimensional object division output unit will be described in detail with reference to FIG. 2 and FIG. 3.

The extraction unit 31 extracts a three-dimensional object having a tree structure from volume data. Examples of a three-dimensional object having a tree structure are blood vessels and bronchi. In embodiments of the present disclosure, bronchi are used as an example of the three-dimensional object, and a case of extracting the bronchi from volume data obtained by imaging at a CT apparatus will be described.

First, the image processing workstation 3 retrieves, from the image storage server 2, volume data V of a patient for whom a three-dimensional model should be produced, and receives volume data V. The image processing workstation 3 extracts the structure of the bronchi of the patient from received volume data V by using the extraction unit 31 (#1).

The bronchi in volume data V appear as a region having low CT values (voxel values) in a CT image, because voxels within the bronchi correspond to an air region. However, the bronchial wall is considered as a linear structure having relatively high CT values. Therefore, a set of voxels having image values that have likelihood of the bronchi is extracted as a bronchial region by using a region expansion method. Further, thinning is performed on the extracted bronchial region, and an obtained linear structure representing the bronchi is extracted.

Alternatively, the bronchi are extracted by performing, based on the distribution of CT values, structure analysis of morphology on each voxel. The bronchi branch at many stages, and the diameter of the bronchi becomes narrower toward their terminal ends. Therefore, Gaussian pyramid images (in other words, plural three-dimensional images having different resolutions) are generated, in advance, by performing multiple resolution transformation on volume data to make the bronchi (a linear structure) in various sizes detectable. A linear structure in various sizes is detected by scanning a detection algorithm for each image of the generated Gaussian pyramid.

The linear structure extracted in this manner is not always detected as a tree structure in which all linear structures are connected to each other. Therefore, the connection relationship of the detected linear structures is reconstructed. Extraction of the tree structure of the bronchi is completed by this reconstruction. The extracted linear structure is classified into end points, branch points and edges. Tree structure data T representing the bronchi are obtained by connecting the end points and the branch points by the edges. Further, feature values, such as the diameter of the bronchi at each position of the tree structure and the length of each edge (a length between branch points of the bronchi), are also stored as tree structure data, if necessary.

Regarding a method for extracting a tree structure, a different method may be used. Alternatively, the tree structure may be extracted by using the method in combination with the other method. Methods for extracting a tree structure disclosed in Japanese Unexamined Patent Publication No. 2010-220742, Japanese Unexamined Patent publication No. 2011-212312, Japanese Unexamined Patent Publication No. 2012-200403, Japanese Unexamined Patent Publication No. 2012-228396, which were filed by the applicant of the present application, and the like may be used.

A tree structure includes plural end points, plural branch points, at least one edge connecting an end point and a branch point to each other and at least one edge connecting two branch points to each other. FIG. 4 is a diagram illustrating an example of a tree structure when the bronchi have been extracted. In FIG. 4, branch points are represented by ●, and end points are represented by ○, and edges are represented by lines.

The multiplicity obtainment unit 32 obtains a multiplicity for each edge by counting the number of times of passage of all paths reaching plural end points from at least one point on the tree structure of the three-dimensional object through each edge (#2).

Figure 5A:
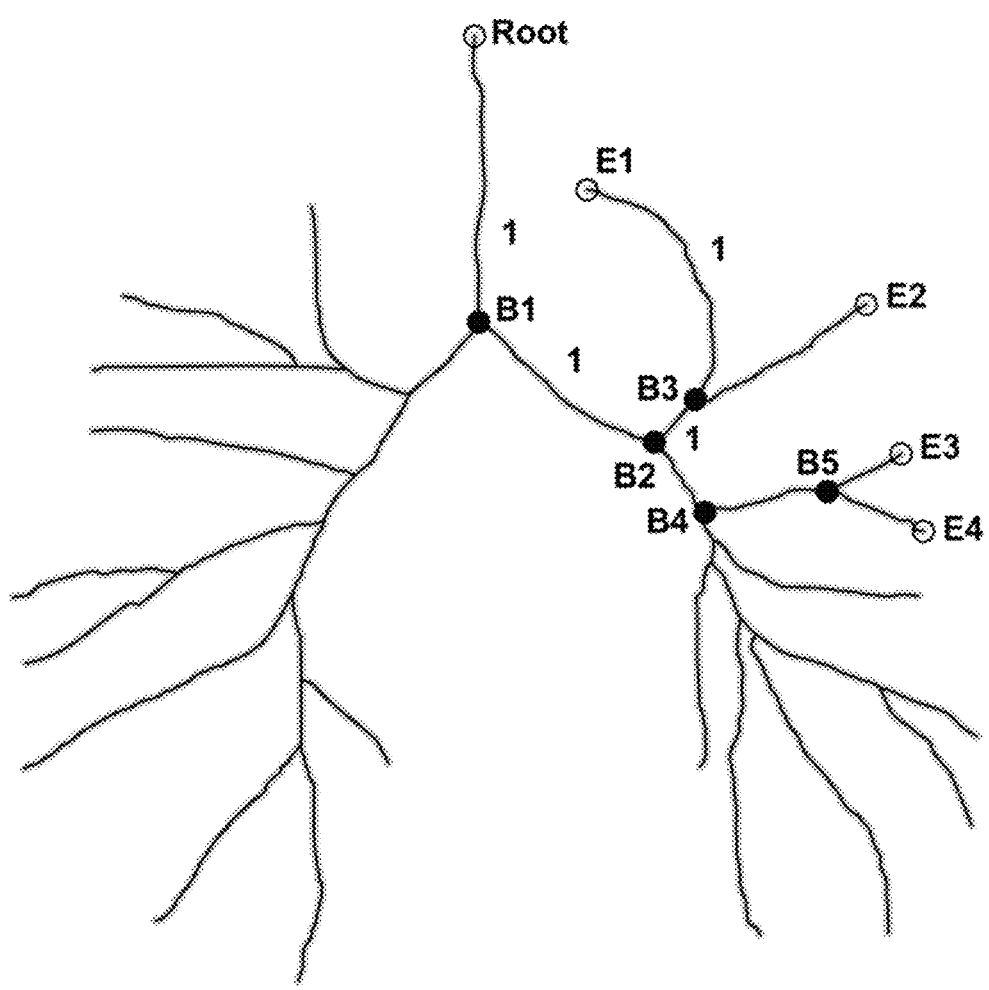
FIG. 5A is a diagram for explaining a method for calculating a multiplicity (No. 1)
Figure 5B:
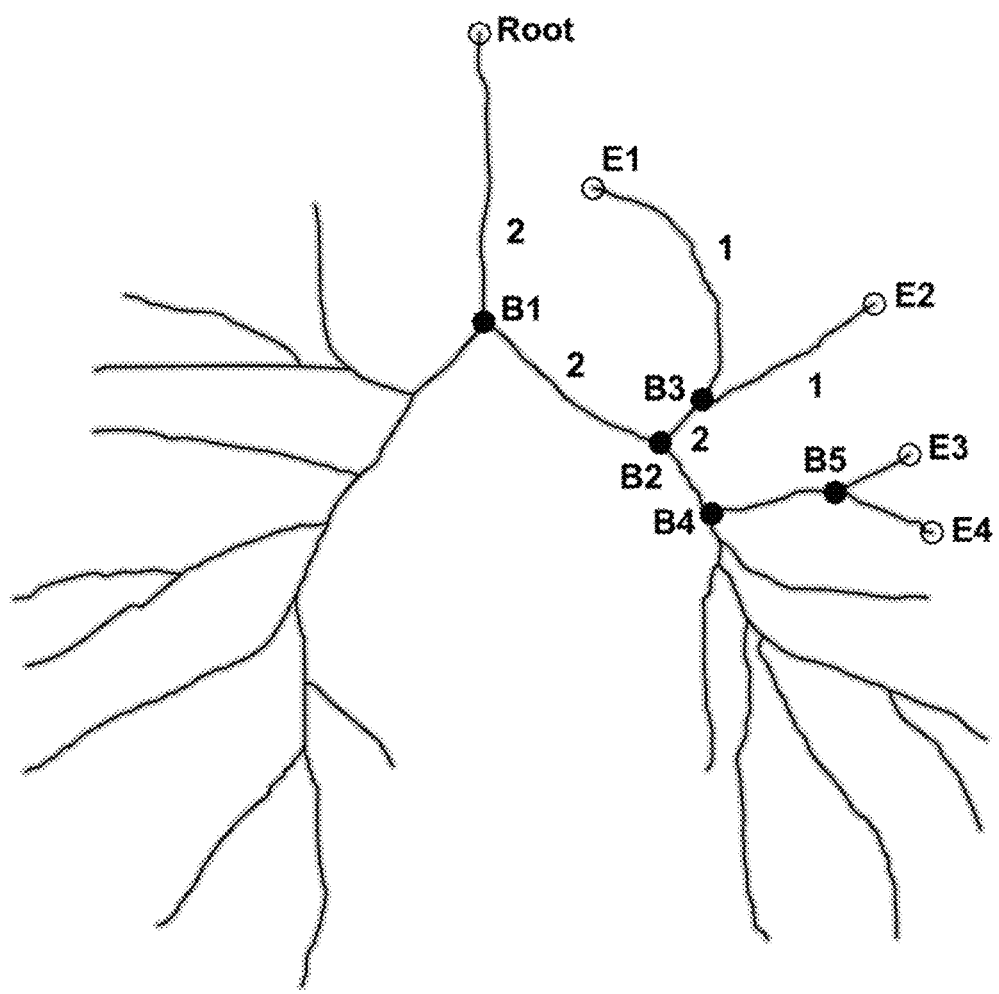
FIG. 5B is a diagram for explaining a method for calculating a multiplicity (No. 2)
Figure 5C:
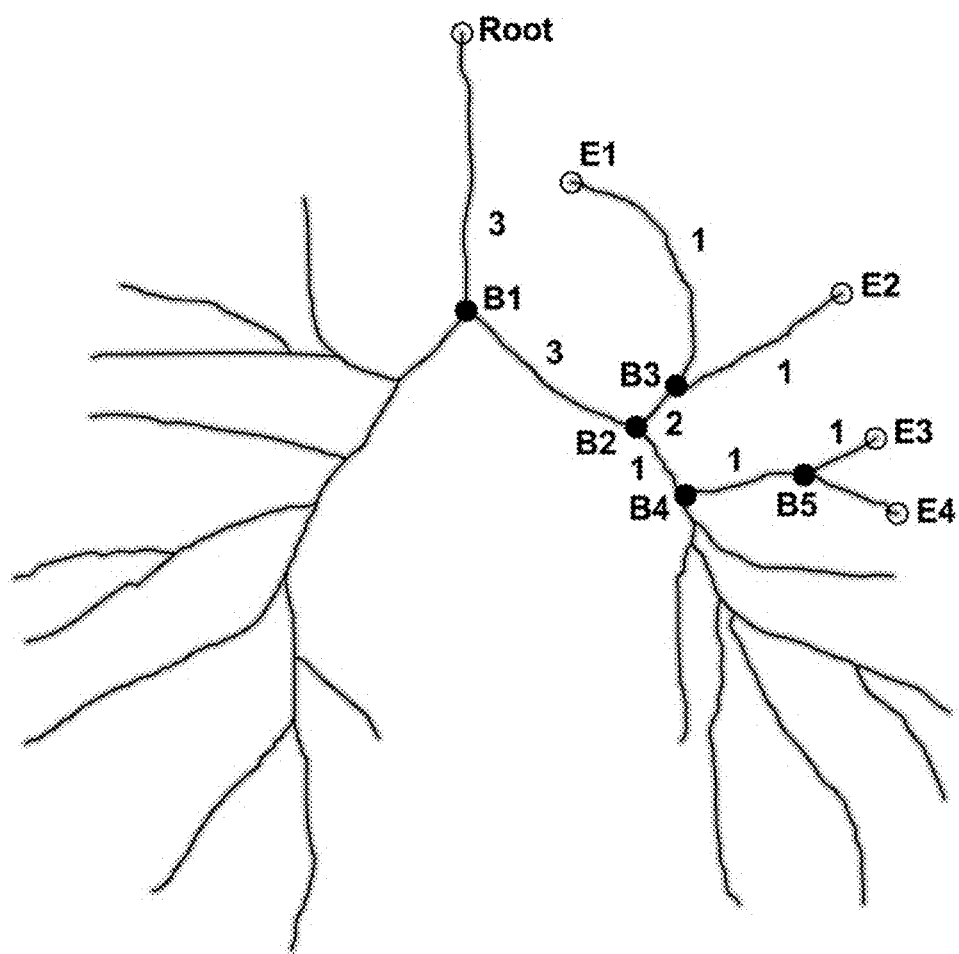
FIG. 5C is a diagram for explaining a method for calculating a multiplicity (No. 3)

A method for calculating the multiplicity will be specifically described by using the tree structures illustrated in FIGS. 5A through 5C. Here, the multiplicity for each edge is obtained, based on all paths reaching, from an end point of the tree structure of the three-dimensional object, plural end points other than the end point, by counting the number of times of passage of each path through each edge.

As illustrated in FIGS. 5A through 5C, an end point corresponding to the airway region of the bronchi is regarded as a root, and the number of times of passage of paths reaching, from root Root, all end points other than root Root, i.e., end points E1, E2, E3, E4 . . . E17, E18, E19 and E20, through each edge is counted.

Figure 5D:
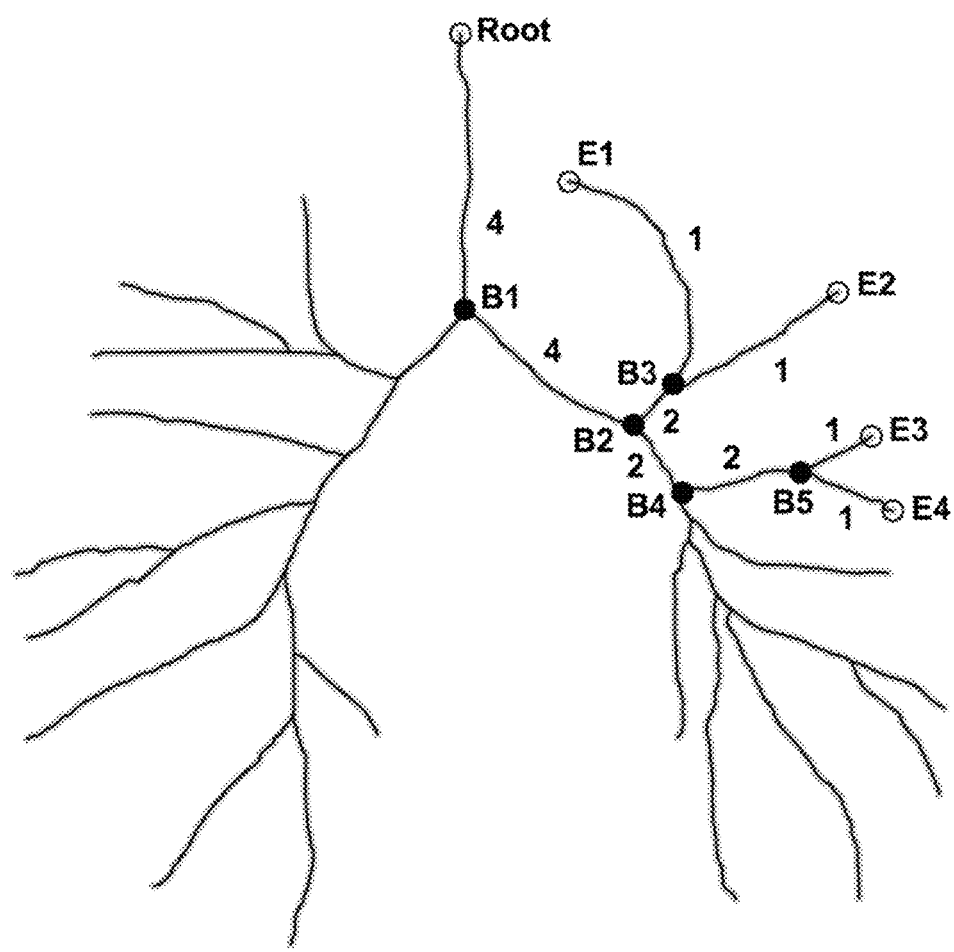
FIG. 5D is a diagram for explaining a method for calculating a multiplicity (No. 4)

First, as illustrated in FIG. 5A, a path reaching end point E1 from root Root passes through an edge connecting root Root and branch point B1 to each other, an edge connecting branch point B1 and branch point B2 to each other, an edge connecting branch point B2 and branch point B3 to each other, and an edge connecting branch point B3 and end point E1 to each other. Therefore, the number of times of passage through each edge is 1. Next, as illustrated in FIG. 5B, a path reaching end point E2 from root Root passes through an edge connecting root Root and branch point B1 to each other, an edge connecting branch point B1 and branch point B2 to each other, an edge connecting branch point B2 and branch point B3 to each other, and an edge connecting branch point B3 and end point E2 to each other. Therefore, the number of times of passage of paths through each edge from root Root to branch point B3 is 2, and the number of times of passage of paths through the edge connecting branch point B3 and end point E2 to each other is 1. Further, as illustrated in FIG. 5C, a path reaching end point E3 from root Root passes through an edge connecting root Root and branch point B1 to each other, an edge connecting branch point B1 and branch point B2 to each other, an edge connecting branch point B2 and branch point B4 to each other, an edge connecting branch point B4 and branch point B5 to each other, and an edge connecting branch point B5 and end point E3 to each other. Therefore, the number of times of passage of paths through each edge from root Root to branch point B2 is 3, and the number of times of passage of paths through the edge connecting branch point B2 and branch point B4 to each other, the edge connecting branch point B4 and branch point B5 to each other and the edge connecting branch point B5 and end point E3 to each other is 1. Similarly, as illustrated in FIG. 5D, a path reaching end point E4 from root Root passes through an edge connecting root Root and branch point B1 to each other, an edge connecting branch point B1 and branch point B2 to each other, an edge connecting branch point B2 and branch point B4 to each other, an edge connecting branch point B4 and branch point B5 to each other, and an edge connecting branch point B5 and end point E4 to each other. Therefore, the number of times of passage of paths through each edge from root Root to branch point B2 is 4, and the number of times of passage of paths through the edge connecting branch point B2 and branch point B4 to each other and the edge connecting branch point B4 and branch point B5 to each other is 2, and the number of times of passage of paths through the edge connecting branch point B5 and end point E4 to each other is 1.

Figure 6:
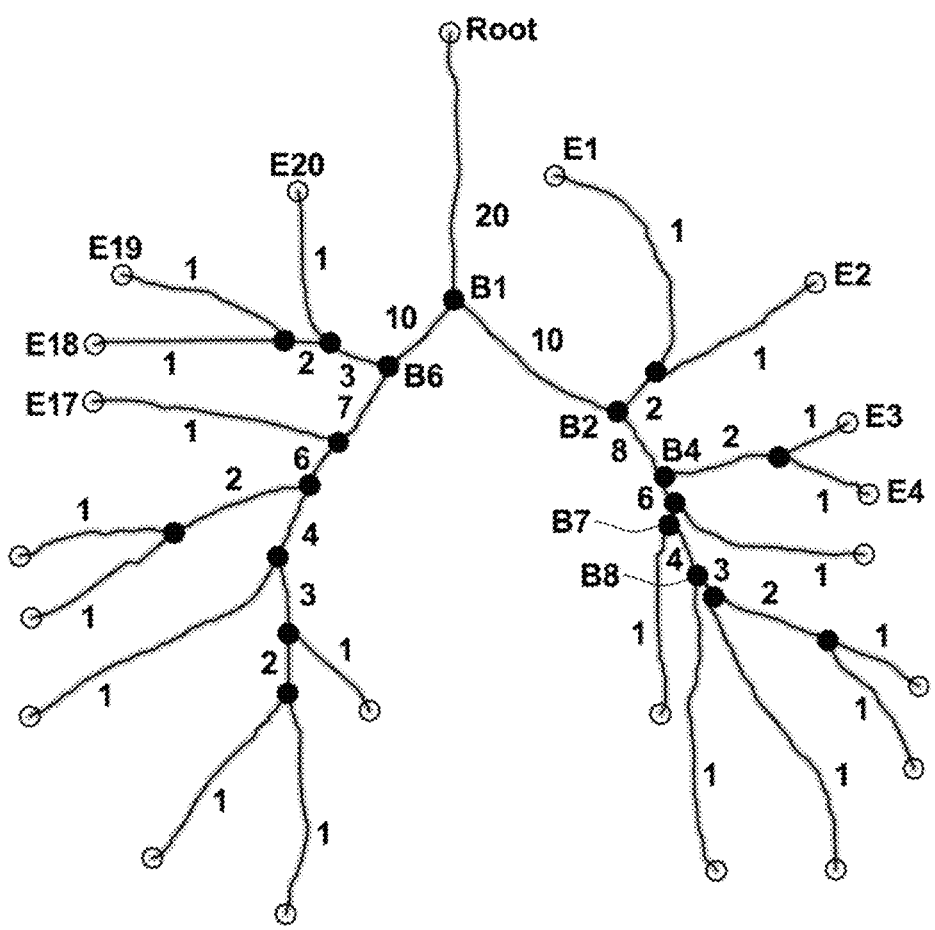
FIG. 6 is a diagram illustrating an example of a result of calculating a multiplicity.

FIG. 6 illustrates a result of counting the number of times of passage through each edge of paths reaching all end points E1, E2, E3, E4 . . . E17, E18, E19 and E20 from root Root.

The division position search unit 33 searches for a division candidate position that maximizes the size of at least one of two division objects obtainable by dividing the tree structure of the three-dimensional object at the division candidate position on an edge connecting two branch points of the tree structure of the three-dimensional object to each other while the size of the at least one of two division objects remains within an output range of a three-dimensional printer 4. Specifically, the division position search unit 33 searches for the division candidate position on one of edges each connecting two branch points to each other at which the size of at least one of division objects obtainable by performing division at the one of edges changes from a size within the output range to a size exceeding the output range.

Here, a method for judging whether a division object is within an output range of the three-dimensional printer 4 or not will be described.

Figure 7A:
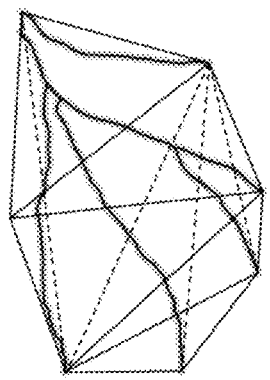
FIG. 7A is a diagram for explaining a method for judging whether a division object is within an output range of a three-dimensional printer or not (No. 1)
Figure 7B:
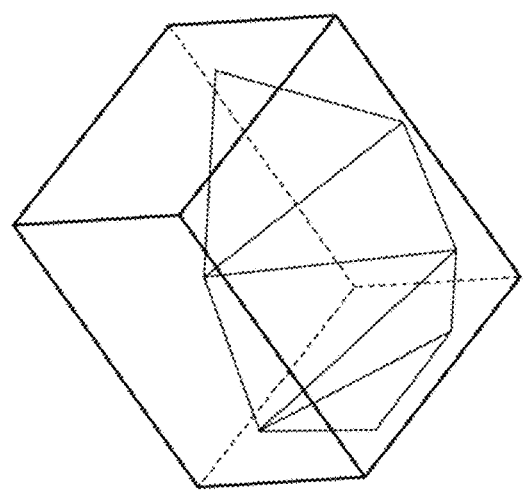
FIG. 7B is a diagram for explaining a method for judging whether a division object is within an output range of a three-dimensional printer or not (No. 2)

A convex hull formed by envelope surfaces, as illustrated in FIG. 7A, is obtained by applying an algorithm for calculating a convex hull to end points of a tree structure included in a division object obtainable by dividing the tree structure at a point on an edge. Further, judgment is made as to whether this convex hull is within the output range of the three-dimensional printer 4. The output range of the three-dimensional printer 4 is defined by a rectangular parallelepiped. Therefore, it is possible to judge whether the convex hull is within the output range of the three-dimensional printer 4 by obtaining a circumscribed rectangular parallelepiped that is circumscribed around the convex hull enclosing the division object, as illustrated in FIG. 7B, and by comparing three edges (height, width and depth) of the circumscribed rectangular parallelepiped with those of the rectangular parallelepiped of the output range of the three-dimensional printer 4. Judgment is made as to whether the circumscribed rectangular parallelepiped is maximized with respect to the output range to minimize the number of times of division of the three-dimensional object. Specifically, a circumscribed rectangular parallelepiped having a height, a width and a depth all of which are less than or equal to those of the maximum output range of the three-dimensional printer 4, and at least one of which is the size of the maximum output range, should be found.

Although it is possible to find many rectangular parallelepipeds that are circumscribed around the convex hull, judgment is made as to whether a smallest rectangular parallelepiped having a smallest volume among the circumscribed rectangular parallelepipeds is within the output range of the three-dimensional printer 4. Accordingly, it is possible to divide the three-dimensional object into a smaller number of parts, and to efficiently output the whole three-dimensional object to the three-dimensional printer 4 in a small number of times of output.

An edge on which a division candidate position is present may be searched for by judging, with respect to all edges, whether the size of one of division objects producible by performing division at a point on each of the edges changes from a size within the output range to a size exceeding the output range. Alternatively, the multiplicity obtained as described above may be used to efficiently search for a division candidate position.

The division position search unit 33 searches for the division candidate position in order of multiplicity from an edge having a highest multiplicity, and judges whether one of two division objects producible by dividing the three-dimensional object at the division candidate position on an edge is within the output range (#3).

In the example illustrated in FIG. 6, an edge connecting root Root and branch point B1 to each other has the highest multiplicity (20). If the length of this edge does not exceed the output range of the three-dimensional printer 4, an edge having the next highest multiplicity is searched for a division candidate position. An edge having the next highest multiplicity is an edge connecting branch points B1 and B2 to each other (the multiplicity is 10) or an edge connecting branch points B1 and B6 to each other (the multiplicity is 10). When the edges have the same multiplicity, evaluation is performed in order by setting a predetermined rule. For example, first, judgment is made for a case of dividing the three-dimensional object at branch point B1 on the edge connecting branch points B1 and B2 to each other. Judgment is made as to whether one of a division object located on the right of branch point B1 and a division object located on the left of branch point B1 in FIG. 6 is within the output range of the three-dimensional printer 4. If none of the division objects is within the output range of the three-dimensional printer 4, judgment is made for a case of dividing the three-dimensional object at branch point B2 on the edge connecting branch points B1 and B2 to each other. Judgment is made as to whether one of a division object located on the right of branch point B2 and a division object located on the left of branch point B2 is within the output range of the three-dimensional printer 4. If none of the division objects is within the output range of the three-dimensional printer 4 also when the three-dimensional object is divided at branch point B2, judgment is made for an edge connecting branch points B1 and B6 to each other. Judgment is made as to whether one of division objects obtainable by dividing the three-dimensional object at branch point B1 on the edge connecting branch points B1 and B6 to each other is within the output range of the three-dimensional printer 4. If none of the division objects is within the output range of the three-dimensional printer 4, judgment is made for a case of dividing the three-dimensional object at branch point B6 on the edge connecting branch points B1 and B6 to each other. If none of the division objects is within the output range of the three-dimensional printer 4 also when the three-dimensional object is divided at branch point B6, judgment is made for an edge connecting branch points B2 and B4 to each other (the multiplicity is 8). Judgment is made in order from an edge having a higher multiplicity in this manner to search for an edge in which, when the three-dimensional object is divided at either one of two ends of the edge, both of division objects obtainable by dividing the three-dimensional object at one of the two ends of the edge exceed the output range but at least one of division objects obtainable by dividing the three-dimensional object at the other end of the edge is within the output range.

Figure 8:
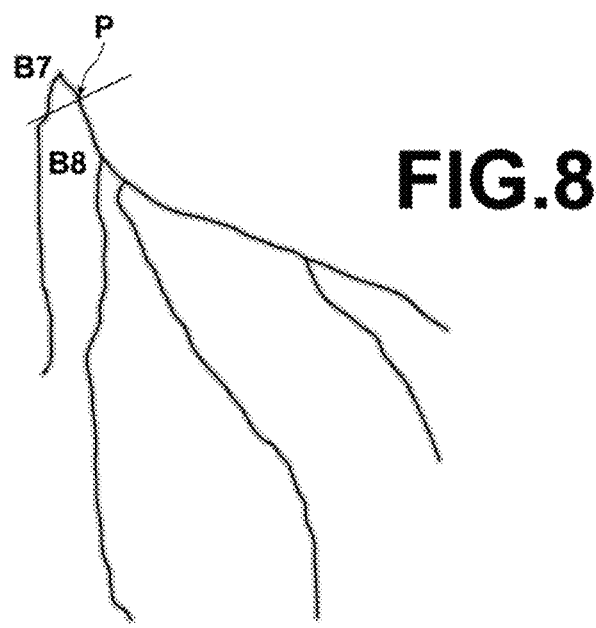
FIG. 8 is a diagram for explaining a division candidate position on an edge.

For example, when a lower-side division object obtainable by dividing the three-dimensional object at branch point B7 on an edge connecting branch points B7 and B8 to each other exceeds the output range, but a lower-side division object obtainable by dividing the three-dimensional object at branch point B8 on the edge connecting branch points B7 and B8 to each other is within the output range, the edge connecting branch point B7 and branch point B8 to each other is searched for a division candidate position at which the size of the division object is maximized with respect to the output range. As illustrated in FIG. 8, position P on the edge connecting branch point B7 and branch point B8 to each other, and at which the size of the division object is maximized with respect to the output range, is determined as the division candidate position.

The division unit 34 divides the three-dimensional object, at a position on the edge on which the division candidate position is present, into a division object having a size within the output range (#4). When an object, such as the bronchi, is divided, it is desirable to divide the bronchi at a position that is as wide as possible, in other words, having as a large diameter as possible to join division objects together later. Therefore, it is desirable to divide the bronchi not at the division candidate position but at a position that is as wide as possible near the division candidate position. For example, the three-dimensional object is divided at a division position at which the bronchi have a largest diameter between division candidate position P and branch point B8 on the edge. When the three-dimensional object is the bronchi, a position close to the root on an edge on which a division candidate position is present is an actual division position in many cases. When a three-dimensional object having a tree structure is blood vessels, some blood vessel has a narrow portion, in other words, a portion having a small diameter. Therefore, it is desirable to divide the three-dimensional object by searching for a division position at which the blood vessel has a largest diameter.

Figure 14:
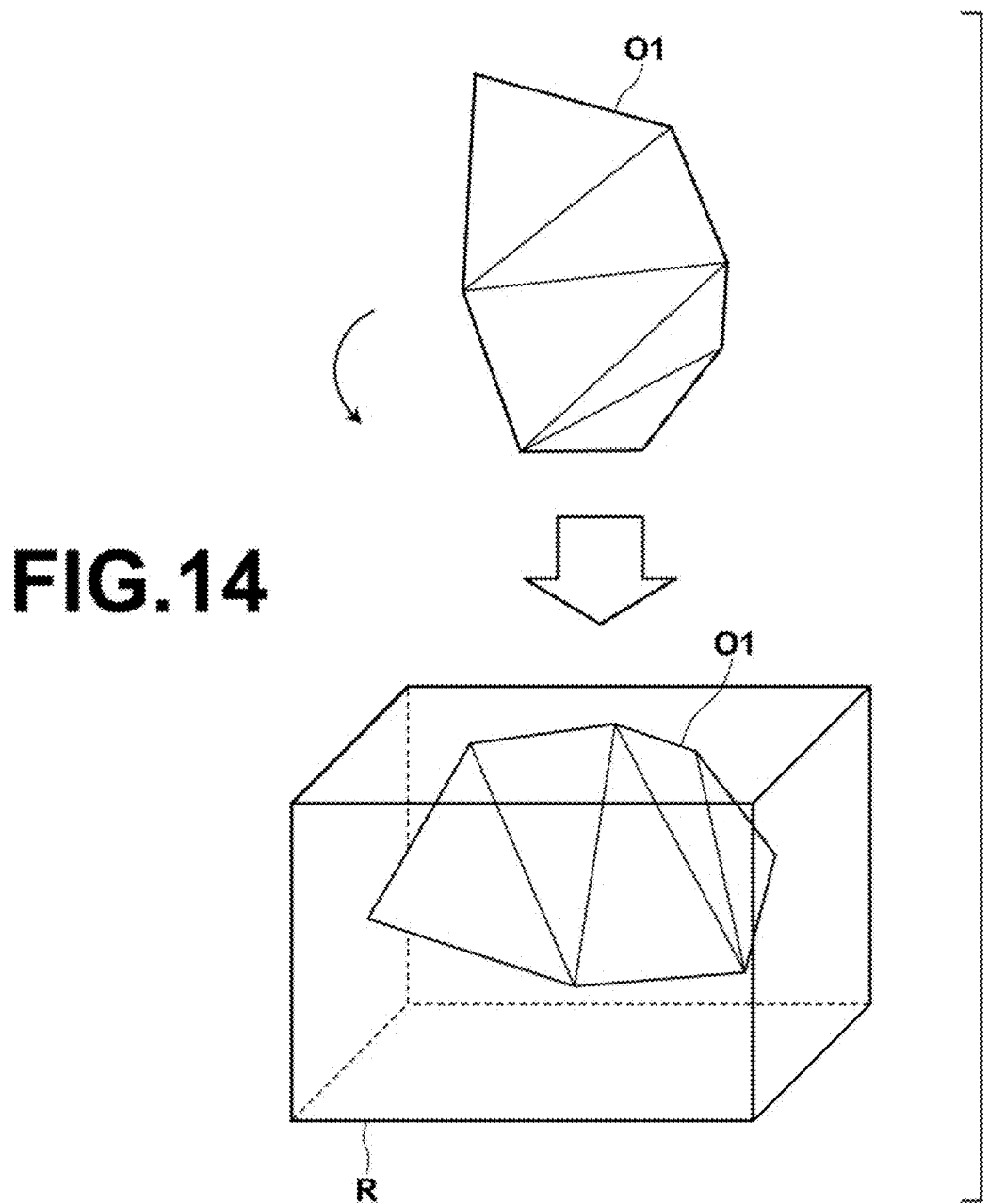
FIG. 14 is a diagram for explaining a method for rotating a division object when the object is output (No. 1)

The output unit 35 outputs the generated division object to the three-dimensional printer 4 (#5). When the output unit 35 outputs the division object, the output unit 35 outputs the division object after rotating the division object in a direction (a black arrow illustrated in FIG. 14). The division object is rotated in such a manner that convex hull O1 composed of end points of the tree structure in the division object, as described in the method for judging whether a division object is within output range R of the three-dimensional printer 4, is within output range R of the three-dimensional printer 4, as illustrated in FIG. 14.

Figure 15:
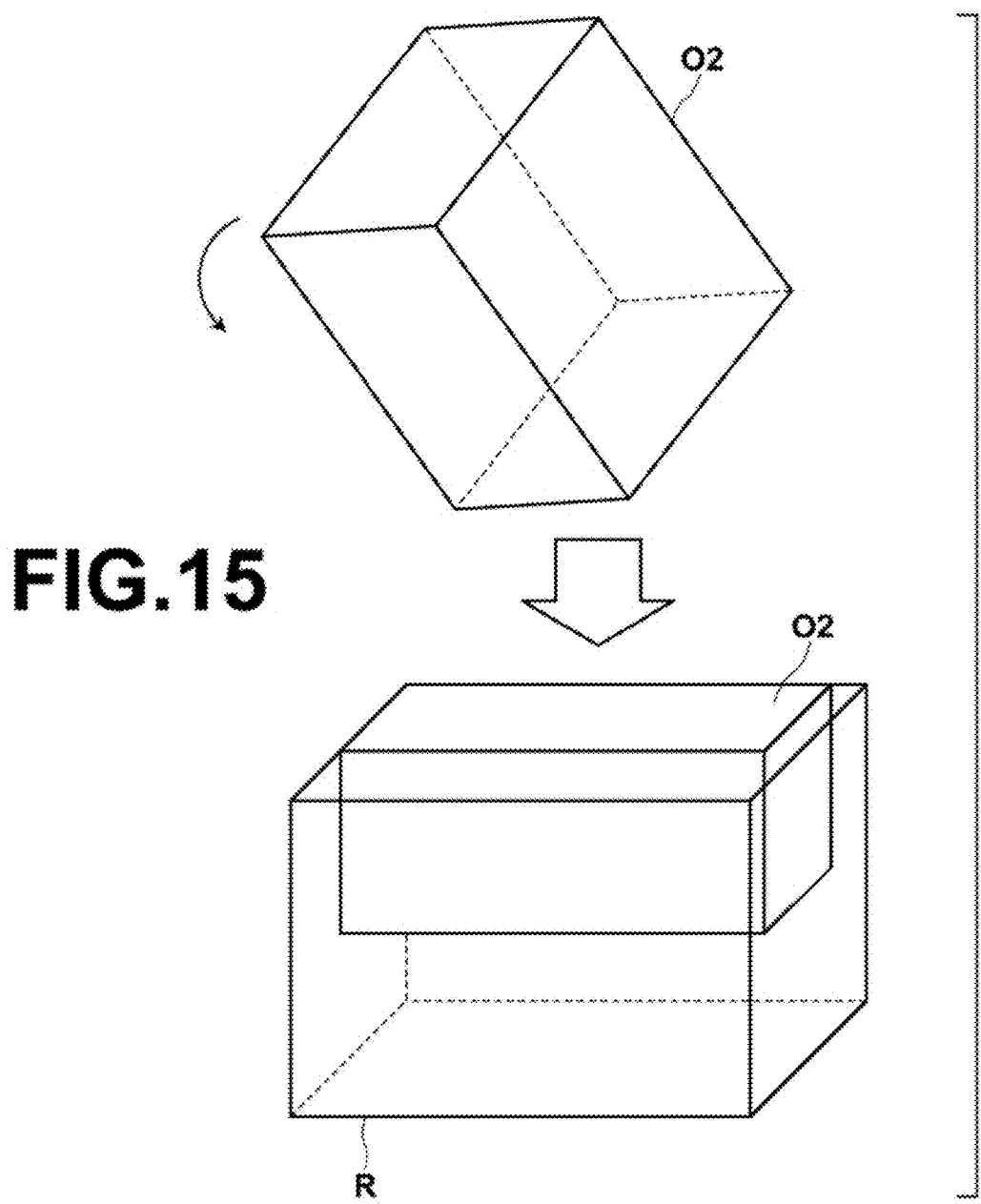
FIG. 15 is a diagram for explaining a method for rotating a division object when the object is output (No. 2).

Alternatively, as illustrated in FIG. 15, a direction (a black arrow illustrated in FIG. 15) that makes an edge of circumscribed rectangular parallelepiped O2, which is circumscribed around the convex hull, parallel to an edge of the rectangular parallelepiped of the output range of the three-dimensional printer 4 may be determined as the rotation direction of the division object. Circumscribed rectangular parallelepiped O2 may not be within output range R of the three-dimensional printer 4 depending on the rotation direction. Therefore, the division object is rotated in such a manner that circumscribed rectangular parallelepiped O2 is within the rectangular parallelepiped of output range R of the three-dimensional printer 4, and output.

Further, the output unit 35 generates cross-sectional data by dividing the rotated division object at contour surfaces, and outputs the cross-sectional data to the three-dimensional printer 4.

After the division object is output, if the remaining three-dimensional object, which excludes the output division object, exceeds the output range of the three-dimensional printer, division is performed again (#6-NO).

Then, the repetition control unit 36 makes processing return to step #3. The division position search unit 33 searches for a division candidate position again in order from an edge having a highest multiplicity. Further, a division object is generated by dividing the three-dimensional object at a position on an edge on which the division candidate position is present (#4), and the division object is output to the three-dimensional printer 4 (#5). These kinds of processing are repeated until the remaining three-dimensional object, which excludes the output division objects, becomes a size within the output range of the three-dimensional printer 4. When the remaining three-dimensional object, which excludes the output division objects, becomes a size within the output range of the three-dimensional printer 4 (#6-YES), the remaining three-dimensional object is output to the three-dimensional printer 4, and processing ends (#7).

Here, a case of calculating a multiplicity only once without calculating a multiplicity again with respect to a remaining three-dimensional object, which excludes an output division object, has been described. Alternatively, as steps #11 through #17 in the flow chart of FIG. 9 show, if the remaining three-dimensional object, which excludes a division object, exceeds the output range of the three-dimensional printer 4, a multiplicity may be calculated again with respect to the remaining three-dimensional object in step #12.

In the above descriptions, a case of obtaining a multiplicity by counting the number of times of passage of each path through each edge based on all paths reaching, from a specific end point (an end point at a root) of plural end points of a tree structure, the end points other than the specific end point was described. Alternatively, the multiplicity may be obtained by counting the number of times of passage of each path through each edge based on all paths reaching, from each of all end points, end points other than themselves. This will be described specifically by using FIGS. 10A through 12.

Figure 10A:
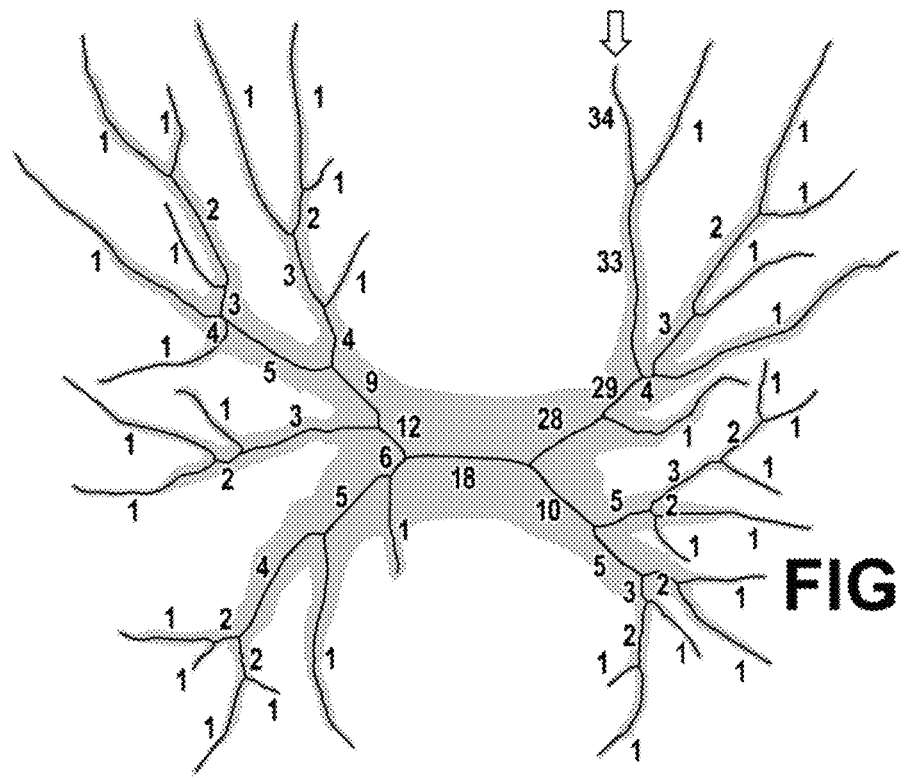
FIG. 10A is a diagram for explaining a method for counting a multiplicity on all paths from each of all end points to end points other than themselves (No. 1)
Figure 10B:
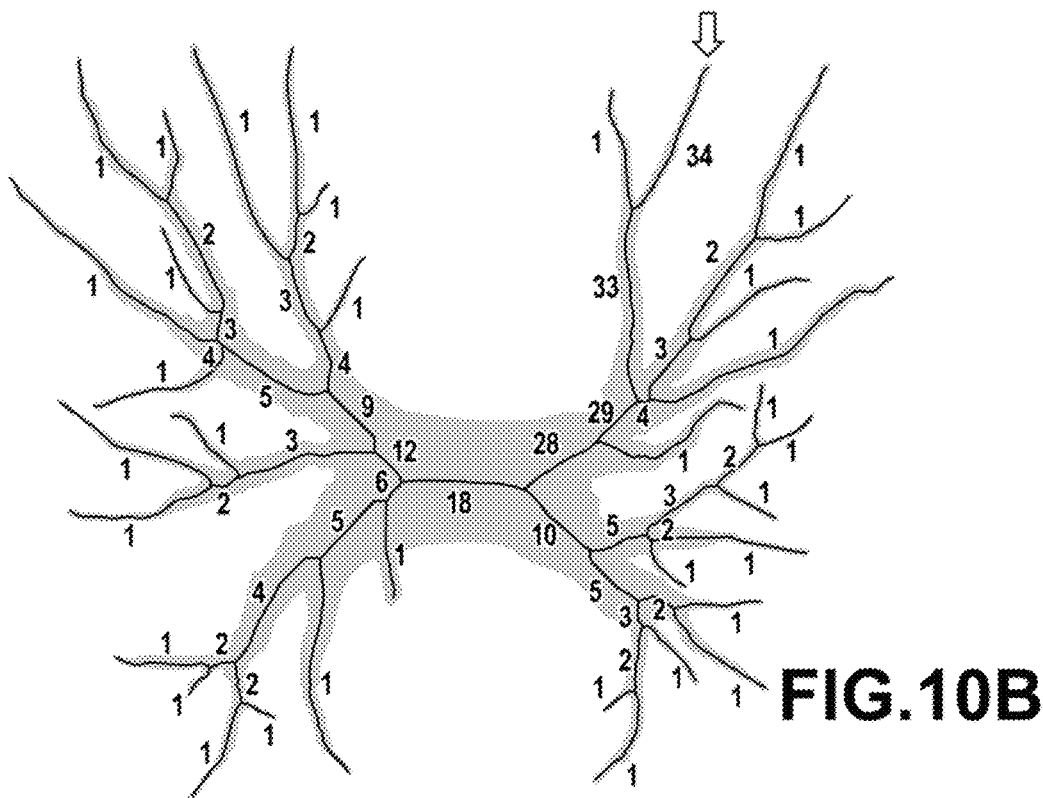
FIG. 10B is a diagram for explaining a method for counting a multiplicity on all paths from each of all end points to end points other than themselves (No. 2)
Figure 10C:
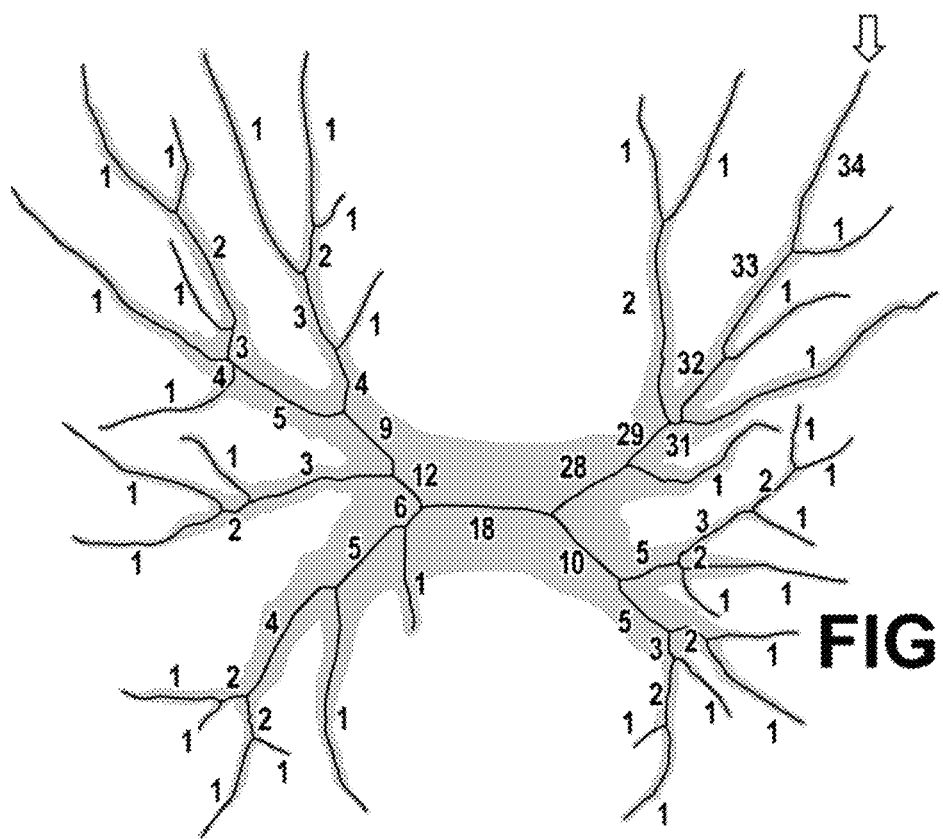
FIG. 10C is a diagram for explaining a method for counting a multiplicity on all paths from each of all end points to end points other than themselves (No. 3)
Figure 10D:
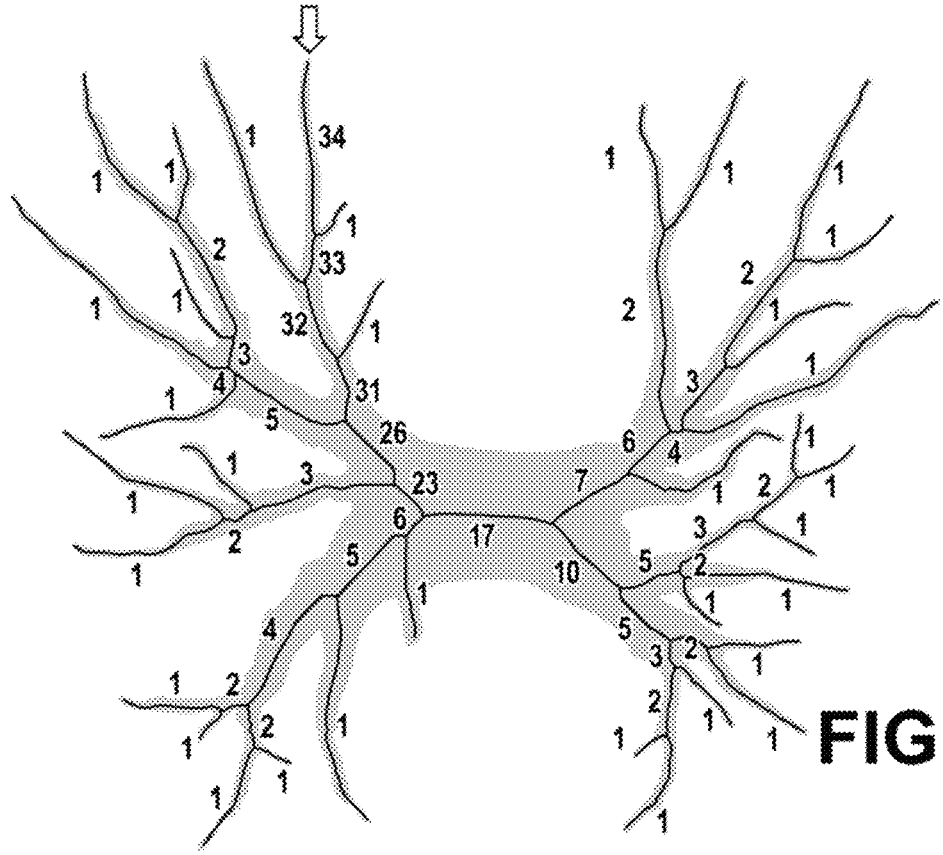
FIG. 10D is a diagram for explaining a method for counting a multiplicity on all paths from each of all end points to end points other than themselves (No. 4)
Figure 10E:
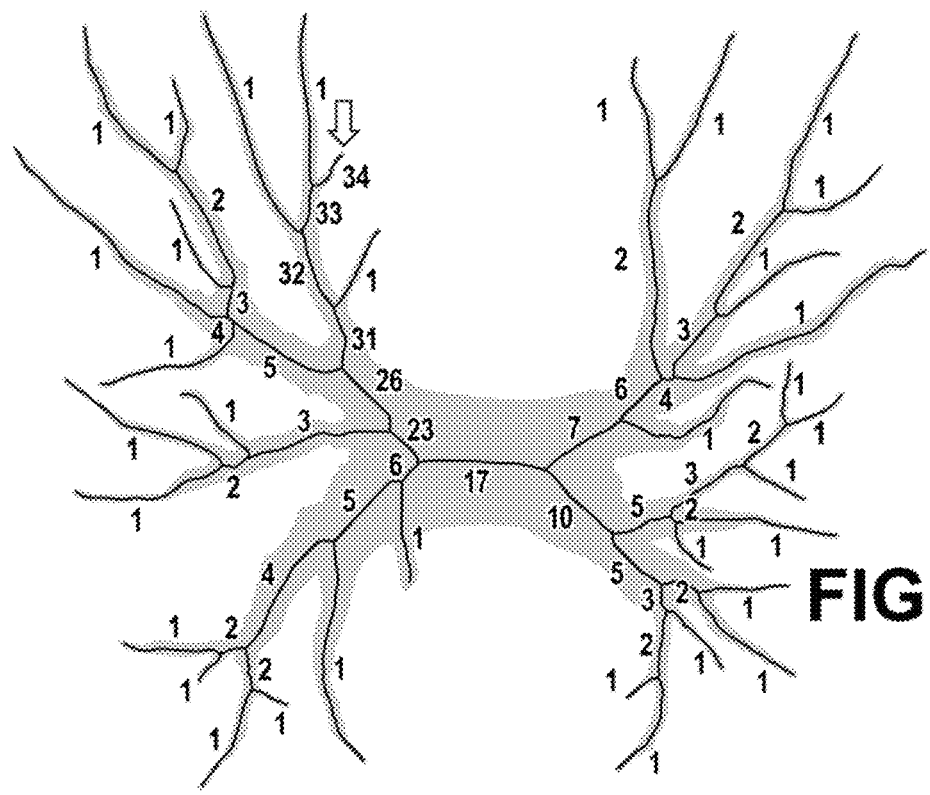
FIG. 10E is a diagram for explaining a method for counting a multiplicity on all paths from each of all end points to end points other than themselves (No. 5)
Figure 10F:
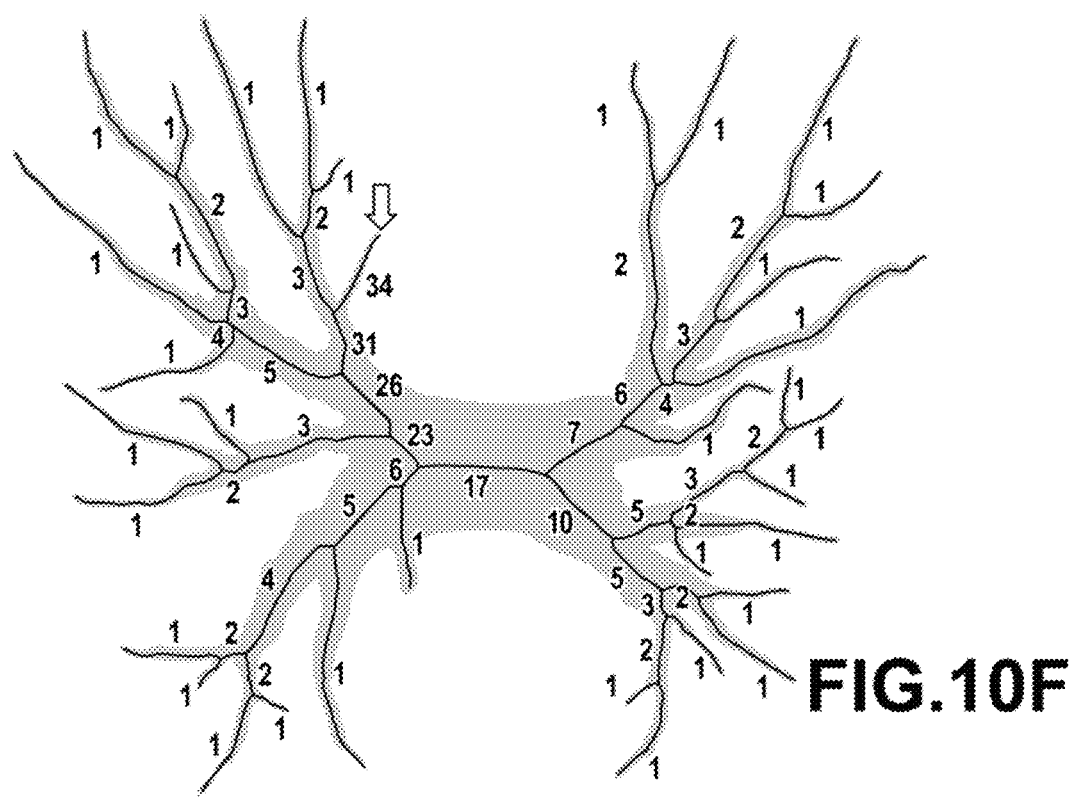
FIG. 10F is a diagram for explaining a method for counting a multiplicity on all paths from each of all end points to end points other than themselves (No. 6)

When a tree structure does not have a root, as illustrated in FIG. 10A, multiplicities are counted on all paths reaching, from each of all end points, end points other than themselves. In FIG. 10A through 10F, each number represents the number of times of passage of each path through each edge counted on paths from an end point toward other end points. FIG. 10A illustrates numbers each obtained by counting the number of times of passage of each path through each edge on paths from a first end point, to which number "34" is assigned, toward end points other than the first end point. FIG. 10B illustrates numbers each obtained by counting the number of times of passage of each path through each edge on paths from a second end point, which is immediately on the right of the first end point, toward end points other than the second end point. FIG. 10C illustrates numbers each obtained by counting the number of times of passage of each path through each edge on paths from a third end point, which is immediately on the right of the second end point, toward end points other than the third end point. Similarly, processing is continued forward for a next end point in a clockwise direction, and the number of times of passage of each path through each edge is counted on paths from each end point toward end points other than themselves. FIG. 10D illustrates numbers each obtained by counting the number of times of passage of each path through each edge on paths from a 32nd end point toward end points other than the 32nd end point. FIG. 10E illustrates numbers each obtained by counting the number of times of passage of each path through each edge on paths from a 33rd end point toward end points other than the 33rd end point. FIG. 10F illustrates numbers each obtained by counting the number of times of passage of each path through each edge on paths from a 34th end point toward end points other than the 34th end point.

Figure 11:
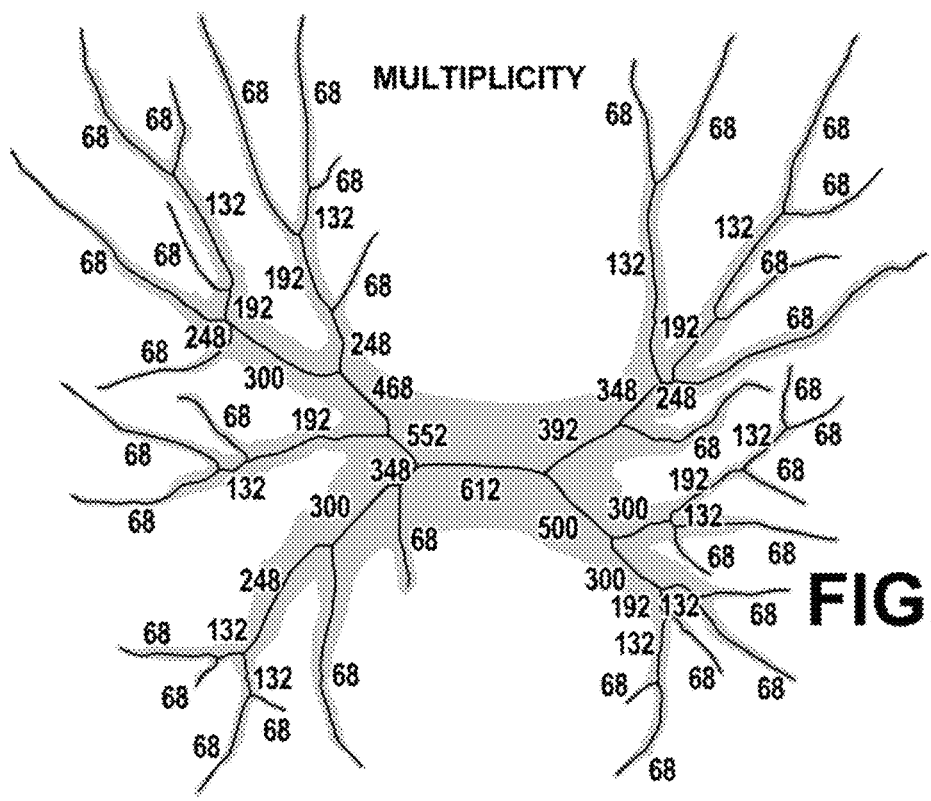
FIG. 11 is a diagram illustrating an example of a multiplicity obtained by counting from all end points.
Figure 12:
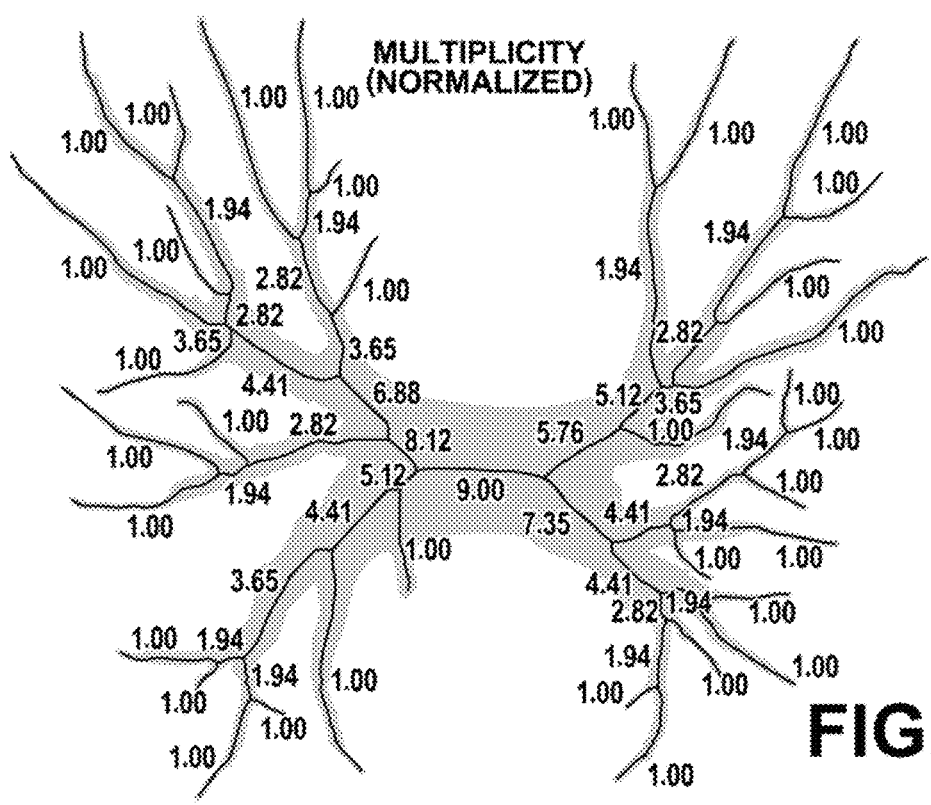
FIG. 12 is a diagram illustrating an example of a normalized multiplicity.

FIG. 11 illustrates numbers each obtained for each edge by adding all of the numbers of times of passage of each path through each edge, and each of the numbers of times having been counted on paths from each of first through 34th end points toward end points other than themselves. The numbers in FIG. 11 represent a multiplicity for each edge. Further, FIG. 12 illustrates multiplicities when the values are normalized so that the multiplicity of an edge connected to an end point becomes 1.

Figure 13:
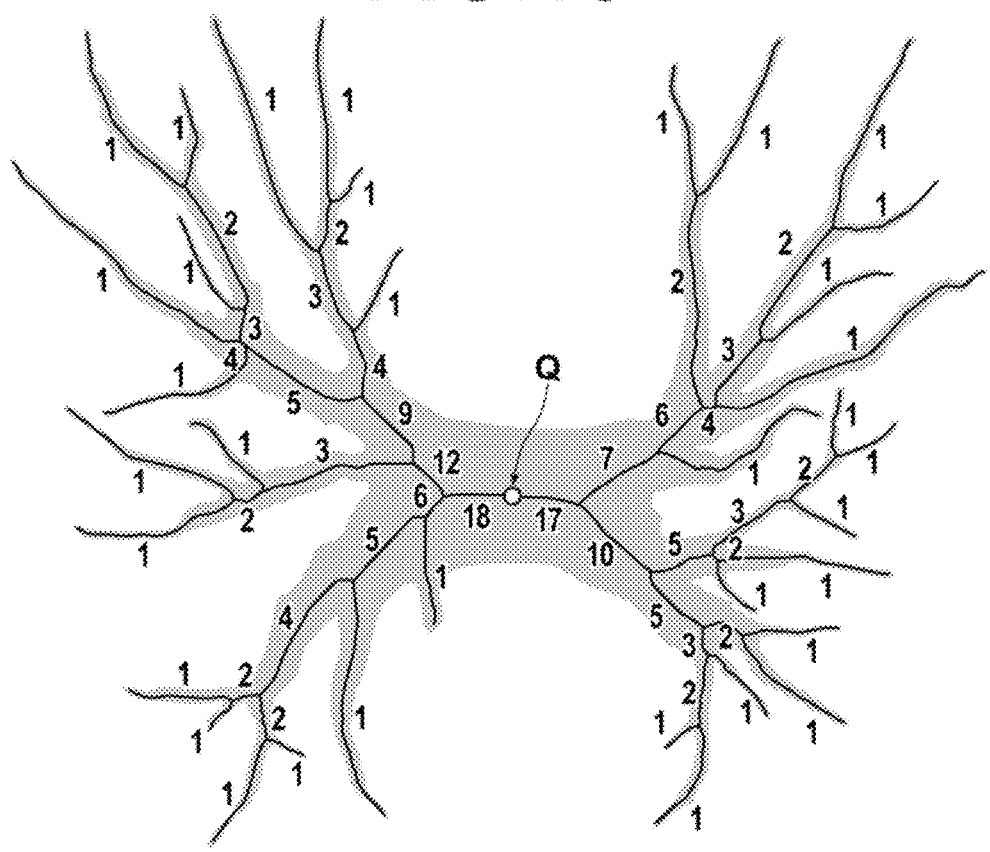
FIG. 13 is a diagram for explaining a method for counting a multiplicity from a point on an edge of a tree structure.

In the above descriptions, a case of counting multiplicities on all paths from end points toward end points other than themselves was described. Alternatively, a multiplicity may be obtained based on paths reaching, from a specific point on a tree structure of a three-dimensional object excluding end points of the tree structure, plural end points of the tree structure. Specifically, as illustrated in FIG. 13, a tree structure is divided into two partial tree structures at one point Q on an edge selected from edges each connecting two branch points of the tree structure to each other. With respect to the two partial tree structures, a multiplicity is obtained for each of the partial tree structures based on all paths reaching, from point Q, end points of the left partial tree structure and end points of the right partial tree structure, respectively. As the multiplicity of the selected edge (the edge on which point Q is present), the smaller value of the multiplicities obtained for the two partial tree structures is set. In the example illustrated in FIG. 13, the multiplicity of the edge on which point Q is present is 17.

A tree structure having no root, as described above, often appears in blood vessels and the like.

Further, in the above descriptions, a method in which a convex hull enclosing a tree structure included in a division object is obtained, and judgment is made as to whether the size of this convex hull is within an output range of the three-dimensional printer 4 was described. Alternatively, judgment may be made simply as to whether the lengths of the height, width and depth of a division object are within the output range of the three-dimensional printer 4.

Alternatively, judgment as to whether a division object is within the output range of the three-dimensional printer 4 may be made by searching for two end points having a longest length therebetween in a division object, and by observing a distance in which the division object extends in two axial directions perpendicular to a straight line connecting the two end points.

In the description about the output unit 35, a case of outputting a division object obtained by simply dividing the three-dimensional object has been described. However, it is desirable that the division object is output to the three-dimensional printer 4 after providing a connecting portion on each of two cut surfaces of the divided objects. The connecting portions have shapes that make the division objects fittable together at the cut surfaces.

The shape of a cut surface obtained by dividing the bronchi or blood vessels at an edge (a branch) is close to a circle. If a connecting portion in circular shape is provided, as the connecting portion, when the division objects are connected to each other, an edge is rotated in some cases, and connected in a direction different from a direction in which the edge should be originally connected. Therefore, it is desirable that the shape of the connecting portion is a scalene triangle, a trapezoid or the like, which uniquely specifies a direction of fitting the connecting portion. Further, when the three-dimensional object is divided at plural positions into division objects, it is desirable that the shapes or sizes of connecting portions of the division objects differ at the plural positions to prevent erroneous connection of the connecting portions.

The present disclosure is not limited to embodiments of the present disclosure. A part or all of the steps of the three-dimensional object division output unit may be performed by a computer, or by a system configured by at least one computer, a server and a storage device connected to each other through a network. Here, each equipment is controlled by a program of the three-dimensional object division output unit described in the specification of the present application, and which is installed from a recording medium, such as a CD-ROM. Further, the program may be installed after being downloaded from a storage device of a server connected to the computer through a network, such as the Internet.

What is claimed is:

1. A three-dimensional object division output apparatus comprising:

an extraction unit that extracts, from volume data, a three-dimensional object having a tree structure including a plurality of end points, a plurality of branch points, at least one edge each connecting one of the plurality of end points and one of the plurality of branch points to each other, and at least one edge each connecting two of the plurality of branch points to each other;

a division position search unit that searches for a division candidate position that maximizes, within the size of an output range of a three-dimensional object creation apparatus, the size of at least one of division objects obtainable by dividing the three-dimensional object at the division candidate position on one of the edges of the tree structure of the three-dimensional object;

a division unit that divides, at a division position on one of the edges on which the division candidate position is present, the three-dimensional object into division objects the size of at least one of which is within the output range; and an output unit that outputs the at least one of the division objects to the three-dimensional object creation apparatus.

2. The three-dimensional object division output apparatus, as defined in claim 1, the apparatus further comprising:

a multiplicity obtainment unit that obtains, based on all paths reaching the plurality of end points from at least one point on the tree structure of the three-dimensional object, a multiplicity for each edge by counting the number of times of passage of each path through each edge, and wherein the division position search unit searches for the division candidate position in order of the multiplicity from an edge having a highest multiplicity.

3. The three-dimensional object division output apparatus, as defined in claim 1, the apparatus further comprising:

a repetition control unit that repeatedly generates, with respect to the tree structure of the three-dimensional object excluding the at least one of the division objects, a new division object by the division position search unit and the division unit.

4. The three-dimensional object division output apparatus, as defined in claim 2, the apparatus further comprising:

a repetition control unit that repeatedly generates, with respect to the tree structure of the three-dimensional object excluding the at least one of the division objects, a new division object by the multiplicity obtainment unit, the division position search unit and the division unit.

5. The three-dimensional object division output apparatus, as defined in claim 1, wherein the division position search unit searches for the division candidate position that maximizes, with respect to the output range, a circumscribed rectangular parallelepiped that is circumscribed around a convex hull formed by envelope surfaces obtained by using end points of the tree structure included in the at least one of the division objects.

6. The three-dimensional object division output apparatus, as defined in claim 5, wherein the circumscribed rectangular parallelepiped is a smallest rectangular parallelepiped, which is circumscribed around the convex hull and has a smallest volume.

7. The three-dimensional object division output apparatus, as defined in claim 5, wherein the output unit outputs the at least one of the division objects by rotating the at least one of the division objects to a direction in which an edge of the circumscribed rectangular parallelepiped is parallel to an edge of a rectangular parallelepiped of the output range of the three-dimensional object creation apparatus and also the circumscribed rectangular parallelepiped is within the rectangular parallelepiped of the output range.

8. The three-dimensional object division output apparatus, as defined in claim 2, wherein the multiplicity obtainment unit obtains, based on all paths reaching, from one of the plurality end points of the tree-structure of the three-dimensional object, the plurality of end points other than the one of the plurality of end points, the multiplicity for each edge by counting the number of times of passage of each path through each edge.

9. The three-dimensional object division output apparatus, as defined in claim 2, wherein the multiplicity obtainment unit obtains, based on all paths reaching, from a specific one of the plurality of end points, the plurality of end points other than the specific end point or all paths reaching, from a specific point on the tree structure of the three-dimensional object other than the plurality of end points, the plurality of end points, the multiplicity for each edge by counting the number of times of passage of each path through each edge.

10. The three-dimensional object division output apparatus, as defined in claim 2, wherein the multiplicity obtainment unit obtains, with respect to each of two partial tree structures obtained by dividing the tree structure of the three-dimensional object into two at a point on an edge selected from the at least one edge each connecting two branch points of the tree structure of the three-dimensional object to each other, the multiplicity based on all paths reaching, from the point on the selected edge, end points of the respective partial tree structures, and determines, as the multiplicity of the selected edge, the multiplicity having a smaller value of the multiplicities obtained for the two partial tree structures.

11. The three-dimensional object division output apparatus, as defined in claim 2, wherein the multiplicity obtainment unit obtains the multiplicity for each edge by adding all of the numbers of times of passage of each path through each edge, and each of the numbers of times having been obtained for each of the plurality of end points by performing count based on all paths reaching, from one of the plurality of end points, the plurality of end points other than the one of the plurality of end points.

12. The three-dimensional object division output apparatus, as defined in claim 1, wherein the division unit divides the three-dimensional object at the division position that makes the size of the at least one of the division objects within the output range, and at which the three-dimensional object is widest on the edge on which the division candidate position is present.

13. The three-dimensional object division output apparatus, as defined in claim 1, wherein the division position search unit searches for the division candidate position on one of the at least one edge each connecting two branch points to each other at which the size of at least one of division objects obtainable by performing division at the one of the at least one edge changes from a size within the output range to a size exceeding the output range.

14. An operation method of a three-dimensional object division output apparatus including an extraction unit, a division position search unit, a division unit and an output unit, the method comprising:

an extraction step in which the extraction unit extracts, from volume data, a three-dimensional object having a tree structure including a plurality of end points, a plurality of branch points, at least one edge each connecting one of the plurality of end points and one of the plurality of branch points to each other, and at least one edge each connecting two of the plurality of branch points to each other;

a division position search step in which the division position search unit searches for a division candidate position that maximizes, within the size of an output range of a three-dimensional object creation apparatus, the size of at least one of division objects obtainable by dividing the three-dimensional object at the division candidate position on one of the edges of the tree structure of the three-dimensional object;

a division step in which the division unit divides, at a position on the one of the edges on which the division candidate position is present, the three-dimensional object into division objects the size of at least one of which is within the output range; and an output step in which the output unit outputs the at least one of the division objects to the three-dimensional object creation apparatus.

15. A non-transitory computer-readable recording medium storing therein a three-dimensional object division output program causing a computer to execute:

an extraction step that extracts, from volume data, a three-dimensional object having a tree structure including a plurality of end points, a plurality of branch points, at least one edge each connecting one of the plurality of end points and one of the plurality of branch points to each other, and at least one edge each connecting two of the plurality of branch points to each other;

a division position search step that searches for a division candidate position that maximizes, within the size of an output range of a three-dimensional object creation apparatus, the size of at least one of division objects obtainable by dividing the three-dimensional object at the division candidate position on one of the edges of the tree structure of the three-dimensional object;

a division step that divides, at a position on the one of the edges on which the division candidate position is present, the three-dimensional object into division objects the size of at least one of which is within the output range; and an output step that outputs the at least one of the division objects to the three-dimensional object creation apparatus.

16. The three-dimensional object division output apparatus, as defined in claim 5, wherein the circumscribed rectangular parallelepiped have a height, a width and a depth all of which are less than or equal to those of the maximum output range of the three-dimensional printer which are defined by a rectangular parallelepiped, and at least one of the height, the width and the depth of the circumscribed rectangular parallelepiped maximize those of the output range of the three-dimensional printer.

* * * * *